US009143377B2

(12) United States Patent
Sagi

(10) Patent No.: US 9,143,377 B2
(45) Date of Patent: Sep. 22, 2015

(54) DEMAPPER FOR ROTATED QAM CONSTELLATIONS

(71) Applicant: QUALCOMM Incorporated, San Diego, CA (US)

(72) Inventor: Ariel Y. Sagi, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/804,710

(22) Filed: Mar. 14, 2013

(65) Prior Publication Data

US 2014/0270012 A1 Sep. 18, 2014

(51) Int. Cl.
*H04L 27/38* (2006.01)
*H04L 27/06* (2006.01)

(52) U.S. Cl.
CPC .............. *H04L 27/38* (2013.01); *H04L 27/06* (2013.01)

(58) Field of Classification Search
CPC ..... H04L 27/06; H04L 27/22; H04L 27/2273; H04L 27/2653; H04L 27/38; H04L 27/3827; H04L 27/3872; H04L 27/389; H04L 2025/03414; H04L 2025/0342
USPC ......... 375/260, 261, 262, 265, 267, 329, 332, 375/340, 341; 329/304, 305; 714/794–796
See application file for complete search history.

(56) References Cited

U.S. PATENT DOCUMENTS

| 8,369,449 | B2 | 2/2013 | Seyedi-Esfahani | |
|---|---|---|---|---|
| 2003/0138055 | A1* | 7/2003 | Saito et al. | 375/262 |
| 2003/0226096 | A1* | 12/2003 | Shen et al. | 714/796 |
| 2009/0052576 | A1* | 2/2009 | Golitschek Edler Von Elbwart et al. | 375/298 |
| 2011/0150143 | A1* | 6/2011 | Han et al. | 375/329 |
| 2012/0134452 | A1 | 5/2012 | Li | |
| 2012/0250805 | A1 | 10/2012 | Shin | |
| 2012/0288039 | A1 | 11/2012 | Kim et al. | |
| 2012/0307942 | A1 | 12/2012 | Bae et al. | |

OTHER PUBLICATIONS

Boutros J., "Signal Space Diversity: A Power—and Bandwidth—Efficient Diversity Technique for the Rayleigh Fading Channel" IEEE Transactions on Information Theory, IEEE, US, vol. 44, No. 4, Jul. 1, 1998, XP011027095 ISSN: 0018-9448 cited in the application the whole document.
Huawei, "Modulation diversity for OFDM," Tdoc R1-030156, Tokyo, Japan, p. 1-p. 7, Feb. 18-21, 2003.
Huawei, "Text proposal for Section 4 in TR25.892 on OFDM Modulation Diversity," Tdoc R1-030410, Paris, France, p. 1-p. 3, May 19-23, 2003.
Li, et al., "Design of Rotated QAM Mapperidemapper for the DVB-T2 Standard," Signal Processing Systems, 2009, IEEE Workshop, pp. 18-23, Oct. 2009.

(Continued)

*Primary Examiner* — Young T Tse
(74) *Attorney, Agent, or Firm* — Shumaker & Sieffert, P.A.

(57) ABSTRACT

Techniques are described for quadrature amplitude modulation (QAM) processing in a rotated QAM constellation. In the techniques, one or more processors determine points within the rotated QAM constellation around a vector location of a received symbol based on a probability density function applied to the vector location. The one or more processors map the points to corresponding mapped symbols of the rotated QAM constellation, and determine a plurality of bits represented by the transmitted symbol based on the corresponding mapped symbols.

49 Claims, 10 Drawing Sheets

(56) References Cited

OTHER PUBLICATIONS

Seguro, et al., "Rotation Matrices for OFDM Transmission," EUROCON—International Conference on Computer as a Tool, IEEE, pp. 1-4, Apr. 2011.

Tomasin, et al., "Low Complexity Demapping of Rotated and Cyclic Q Delayed Constellations for DVB-T2", IEEE Wireless Communications Letters, vol. 1, No. 2, pp. 81-84, Apr. 2012.

"Frame structure channel coding and modulation for a second generation digital terrestrial television broadcasting system," DVB-T2, TESI EN 302 755, V1.1.1., Sep. 2009, 167 pp.

Bae, et al., "Low Complexity Two-Stage Soft Demapper for Rotated Constellation in DVB-T2," IEEE International Conference on Consumer Electronics, Jan. 13-16, 2012, pp. 618-619.

Kiyani, et al., "OFDM with BICM-ID and Rotated MPSK Constellations and Signal Space Diversity," IEEE, Nov. 15, 2007, 4 pp.

Kim, et al., "One-Dimensional Soft-Demapping using Decorrelation wtih Interference Cancellations for Rotated QAM Constellations," IEEE, Jan. 2012, pp. 787-791.

Assis, et al., "Rotated Constellation MC-CDMA Systems," Global Telecommunication Conference, IEEE Dec. 1999, pp. 996-1001.

\* cited by examiner

US 9,143,377 B2

DEMAPPER FOR ROTATED QAM CONSTELLATIONS

TECHNICAL FIELD

This disclosure relates to a demapping scheme for rotated Quadrature Amplitude Modulation (QAM) constellations.

BACKGROUND

In a digital communication network, data (e.g., one or more bits) is communicated between network devices using radios and network links (e.g., channels). Each link represents a physical and/or logical communication path between two or more devices and each radio transmits and/or receives data transmitted between network devices over these links. A transmitting radio is responsible for encoding data into a radio signal (e.g., by modulating one or more subcarrier signals), and transmitting the modulated subcarrier signals over a link. A receiving radio receives the transmitted signal and decodes the signal into digital data.

Network links can be established from both wired and wireless media and some network links are more susceptible to signal degradation than others. Signal degradation, such as fading, can impact whether a receiving radio correctly decodes an intended data unit transmitted on the network. Interference and signal loss can cause a radio signal to fade and/or introduce noise into the signal. Faded and noisy signals, once decoded, can lead to inaccurate and/or corrupted data. Signals that travel in the same physical link may operate at different frequencies such that a single link may include multiple channels of communication.

Some networks utilize signal modulation and mixing techniques to improve the bandwidth and rate of a radio signal transmission and communication links. For instance, rather than serially sending or receiving individual units of data with individual signals during individual blocks of time, modulation allows a radio to send and receive multiple units of data simultaneously and in parallel by combining multiple signals that each represent individual data units into one modulated signal that is transmitted at one moment in time. The recipient of a modulated signal can receive multiple data units simultaneously by de-modulating the modulated signal into multiple individual signals that each represent single units of data.

SUMMARY

In general, techniques are described for performing a demapping scheme for Quadrature Amplitude Modulation (QAM) constellations, such as rotated QAM constellations. In some examples, such as a rotated QAM constellation, a baseband processor of a receiving device receives a QAM symbol transmitted over two independent subcarrier signals (e.g., orthogonal frequency division multiplexing (OFDM) subcarriers) from a transmitting device. The transmitted QAM symbol represents a plurality of bits. The baseband processor includes a demapper unit that determines the plurality of bits based on the received QAM symbol (in the case of hard demapping) or determines a Log-likelihood ratio (LLR) value for each bit position of the plurality of bits (in the case of soft demapping). The demapping unit may output the plurality of bits or the plurality of LLR values to a decoder. The output of the demapping unit may be referred to as soft-bits, soft values, or LLR values.

The demapper unit may determine a vector location of the received symbol on the QAM constellation, which may be a rotated QAM constellation in some examples, and assign a probability density function to the vector location. Based on the probability density function, the demapper unit may determine points within the QAM constellation around the vector location. The points within the QAM constellation may or may not map to actual symbol locations within the QAM constellation. Rather, these points within the QAM constellation indicate points within the constellation with high probabilities of corresponding to actual symbols of the QAM constellation (referred to as mapped symbols) to which the received symbol may correspond.

The demapper unit may assign each point to a corresponding mapped symbol that is nearest to the location of the point. The demapper may determine metrics based on each of the corresponding mapped symbols. In the case of hard demapping, the demapper may output the plurality of bits associated with the one corresponding mapped symbol with the lowest computed metric. In the case of soft demapping, as one example for determining the LLR values, the demapper may determine the minimum of computed metrics for each hypothesis for each bit of the plurality of bits. The difference between the minimum computed metrics for each hypothesis for a bit of the plurality of bits is referred to as a log-likelihood ratio (LLR) value for that bit. The demapper may output to a decoder either the plurality of bits (when hard demapping), or the LLR value for each bit position of the plurality of bits (when soft demapping).

In one example, the disclosure is directed to a method for quadrature amplitude modulation (QAM) processing in a rotated QAM constellation. The method includes receiving, with a one or more processors, a transmitted symbol indicating a plurality of bits, determining, with the one or more processors, a vector location of the received symbol within the rotated QAM constellation, determining, with the one or more processors, points within the rotated QAM constellation around the vector location based on a probability density function applied to the vector location, mapping, with the one or more processors, the points to corresponding mapped symbols of the rotated QAM constellation, and determining, with the one or more processors, the plurality of bits based on the corresponding mapped symbols.

In one example, the disclosure is directed to a device for quadrature amplitude modulation (QAM) processing in a rotated QAM constellation. The device includes one or more processors configured to receive a transmitted symbol indicating a plurality of bits, determine a vector location of the received symbol within the rotated QAM constellation, determine points within the rotated QAM constellation around the vector location based on a probability density function applied to the vector location, map the points to corresponding mapped symbols of the rotated QAM constellation, and determine the plurality of bits based on the corresponding mapped symbols.

In one example, the disclosure is directed to an integrated circuit (IC) device for quadrature amplitude modulation (QAM) processing in a rotated QAM constellation. The IC device is configured to receive a transmitted symbol indicating a plurality of bits, determine a vector location of the received symbol within the rotated QAM constellation, determine points within the rotated QAM constellation around the vector location based on a probability density function applied to the vector location, map the points to corresponding mapped symbols of the rotated QAM constellation, and determine the plurality of bits based on the corresponding mapped symbols.

In one example, the disclosure is directed to a device for quadrature amplitude modulation (QAM) processing in a rotated QAM constellation. The device includes means for receiving a transmitted symbol indicating a plurality of bits, means for determining a vector location of the received symbol within the rotated QAM constellation, means for determining points within the rotated QAM constellation around the vector location based on a probability density function applied to the vector location, means for mapping the points to corresponding mapped symbols of the rotated QAM constellation, and means for determining the plurality of bits based on the corresponding mapped symbols.

In one example, the disclosure is directed to a computer-readable storage medium having instructions stored thereon that when executed cause one or more processors of a device, for quadrature amplitude modulation (QAM) processing in a rotated QAM constellation, to receive a transmitted symbol indicating a plurality of bits, determine a vector location of the received symbol within the rotated QAM constellation, determine points within the rotated QAM constellation around the vector location based on a probability density function applied to the vector location, map the points to corresponding mapped symbols of the rotated QAM constellation, and determine the plurality of bits based on the corresponding mapped symbols.

The details of one or more examples are set forth in the accompanying drawings and the description below. Other features, objects, and advantages of the disclosure will be apparent from the description and drawings, and from the claims.

DETAILED DESCRIPTION

Figure 1:
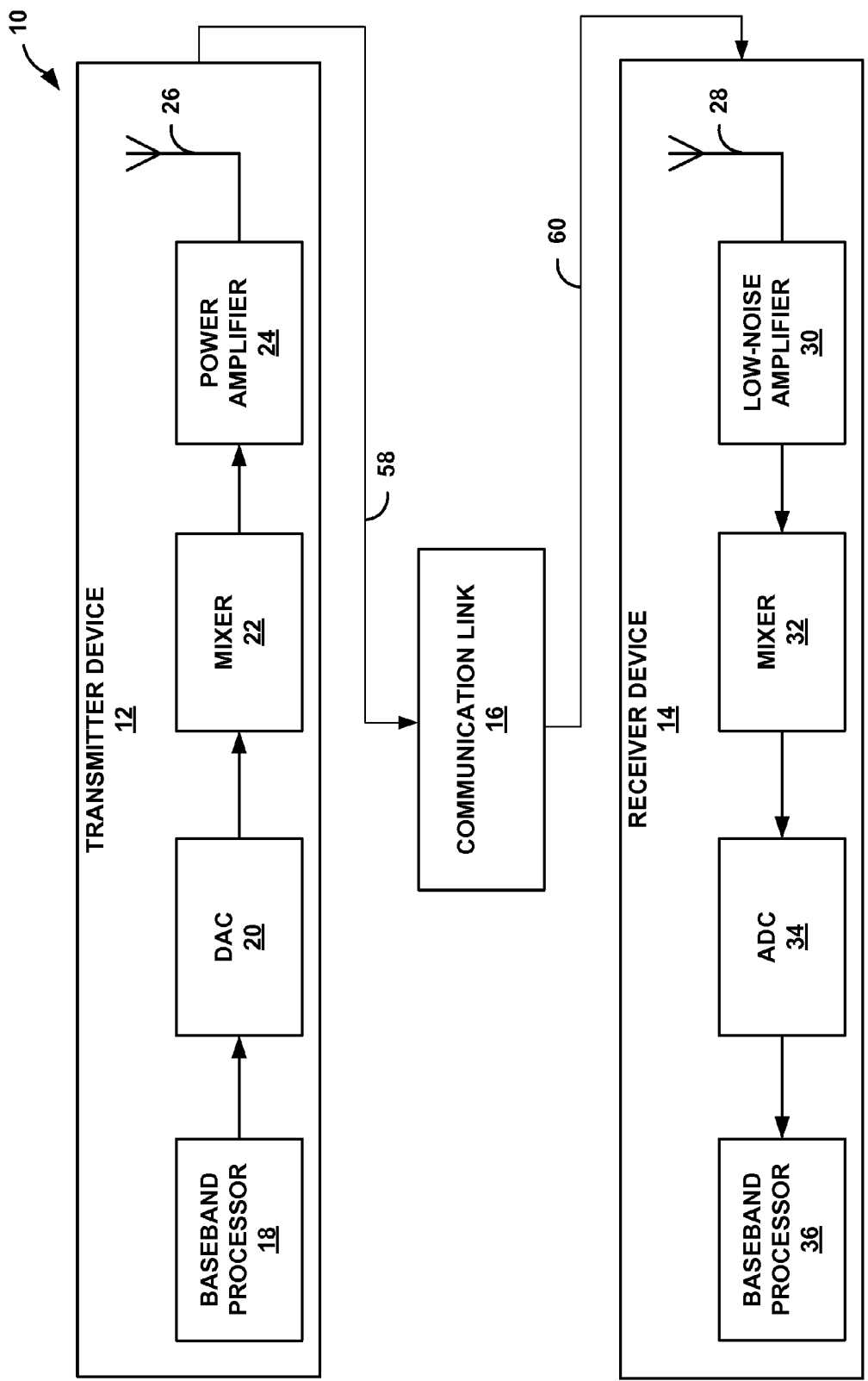
FIG. 1 is block diagram illustrating an example digital communication system, in accordance with one or more aspects of the present disclosure.

The techniques described in this disclosure are related to determining a plurality of bits from a received quadrature amplitude modulation (QAM) symbol in a QAM constellation, such as a rotated QAM constellation. A transmitter device receives a plurality of bits (e.g., from a channel encoder), and modulates the bits utilizing the QAM constellation. The mapped QAM symbols are transmitted on an orthogonal frequency-division multiplexing (OFDM) sub-carriers in case of OFDM scheme. The QAM constellation includes a plurality of symbols (referred to as mapped symbols in this disclosure). A rotated QAM constellation may be similar to the QAM constellation but rotated by a fixed angle. Each of the mapped symbols corresponds to a plurality of bits of a bitstream and is identifiable by a vector that includes an in-phase (I) component and a quadrature component (Q). The I component and the Q component together form a QAM symbol. In the case of rotated QAM constellation with OFDM the transmitter maps I and Q of a mapped symbol to different OFDM subcarriers. The transmitter transmits the QAM symbol to a receiver device. In this way, the transmitted QAM symbol represents a plurality of bits of a bitstream (i.e., one QAM symbol represents some of the bits within the entire bitstream).

The receiver device also stores a QAM constellation that is identical to the QAM constellation on the transmitter device side. For example, for a rotated QAM constellation, the receiver device stores the QAM constellation rotated by the same fixed angle. However, due to the channel characteristics of the channel on which the transmitter device transmitted the QAM symbol, the received QAM symbol may not align with a mapped symbol of the QAM constellation on the receiver device. For example, the channel may be noisy and cause fading. The noise and fading may modify the transmitted QAM symbol such that the received QAM symbol is different than the transmitted QAM symbol. Because the received QAM symbol is different than the transmitted QAM symbol, the I and Q components of the received QAM symbol may be different than the I and Q components of the transmitted QAM symbol. Because the I and Q components of the transmitted QAM symbol indicate the plurality of bits of the bitstream, the receiver device may need to perform additional processing utilizing the received QAM symbol to determine the plurality of bits of the bitstream.

There may be two techniques that the receiver device utilizes to determine the plurality of bits of the bitstream. A first technique is referred to as hard demapping, and a second technique is referred to as soft demapping. In both hard demapping and soft demapping, the receiver device computes a plurality of metrics. Each metric may be based on the location of the received QAM symbol (i.e., the I and Q components of the received QAM symbol) and the location of one mapped QAM symbol (i.e., the I and Q components of a symbol within the QAM constellation).

For hard demapping, the receiver device may identify a mapped QAM symbol from the computed metrics and the plurality of bits associated with the identified mapped QAM symbol to determine the plurality of bits of the bitstream. For soft demapping, the receiver may determine log-likelihood ratio (LLR) values for each of the bits of the plurality of bits from the computed metrics, and utilize the LLR values to determine the plurality of bits of the bitstream. Hard mapping and soft mapping are described in more detail below.

As described above, for both hard demapping and soft demapping, the receiver device may compute a plurality of metrics, where each metric is based on a location of the received QAM symbol and a mapped QAM symbol in the QAM constellation. In the techniques described in this disclosure, the receiver device may determine which QAM symbols of the QAM constellation to utilize for purposes of computing the metrics. For example, the receiver device may utilize a probability density function based on the location of the received QAM symbol. The probability density function may be a function of fade and noise. From the probability density function, the receiver device may determine a plurality of points on the QAM constellation. The receiver device may determine a subset of mapped QAM symbols (i.e., symbols on the QAM constellation) based on the determined plurality of points. The receiver device may utilize the subset of mapped QAM symbols for computing the plurality of metrics (i.e., one metric for each mapped QAM symbol in the subset).

The receiver utilizes the computed plurality of metrics for hard demapping or soft demapping. For example, for hard demapping, the receiver device determines a mapped QAM symbol within the QAM constellation from the computed plurality of metrics, and determines the plurality of bits associated with the determined mapped QAM symbol. For soft demapping, the receiver determines an LLR value for each bit of the plurality of bits from the computed metrics. For instance, the LLR value for a bit may equal a difference between the minimum of the computed metrics for that bit for different hypothesis scaled by a factor accounting for the noise.

For example, each mapped symbol of the QAM constellation is associated with a hypothesis of 0 or 1. Also, the hypothesis for the mapped symbols may be different for different bits of the plurality of bits. The receiver device may determine metrics based on the subset of the mapped symbols. For each bit, the receiver device may determine the minimum metric for the subset of mapped symbols associated with a hypothesis of 0 and minimum metric for the subset of mapped symbols associated with a hypothesis of 1. The receiver device may determine a difference between the two minimum metrics, scale the difference value with a factor accounting for noise, and the resulting value is the LLR value for the bit. Determining the LLR values based on the difference between minimum metrics is one example way of determining the LLR values, and the techniques described in this disclosure should not be considered limited to computing LLR values in this way.

Utilizing probability density functions, in accordance with the techniques described in this disclosure, may promote efficient computation for hard and soft demapping, as compared to some other techniques (i.e., techniques not accordance with this disclosure). For instance, in some other techniques, the receiver device may compute a metric for every single mapped QAM symbol in the QAM constellation. In general, computing metrics is processing intensive. Accordingly, computing metrics for all QAM constellation points may be especially burdensome from the standpoint of processing overhead and power consumption.

In the techniques of this disclosure, the receiver device may not need to compute a metric for every single mapped QAM symbol in the QAM constellation. Rather, the receiver device may compute a metric for a subset of the mapped QAM symbols of the QAM constellation as determined from the probability density function.

Some other techniques have been proposed to reduce the computations for the metrics, but such other techniques still require computing metrics for every single mapped QAM symbol. To further reduce the computations, some other techniques select a sub-region of the QAM constellation and the receiver device utilizes the mapped QAM symbols within the sub-region for computing the metrics. However, in these other techniques, the receiver device selects the sub-region without accounting for the fading. Accordingly, if there is substantial fading, the receiver device may not compute the correct LLR values for soft demapping, or may identify a mapped QAM symbol that is different than the transmitted QAM symbol for hard mapping.

In the techniques described in this disclosure, by utilizing a probability density function, there may be additional assurance that the subset of mapped QAM symbols, which the receiver device utilizes for computing the metrics, are the mapped QAM symbols that will allow the receiver device to determine the plurality of bits of the bitstream correctly. In other words, in the techniques described in this disclosure, the determined plurality of bits of the bitstream is more likely to be the actual plurality of bits of the bitstream, as compared to sub-region techniques. Furthermore, because the receiver device may utilize a subset of the mapped QAM symbols within the QAM constellation, as compared to every single mapped QAM symbol in the QAM constellation, the receiver device may need to perform fewer computations for determining the plurality of bits. In this manner, the techniques described in this disclosure promote processing efficiency in determining the plurality of bits of the bitstream.

FIG. 1 is block diagram illustrating an example digital communication system, in accordance with one or more aspects of the present disclosure. FIG. 1 shows system 10 which includes transmitter (TX) device 12 and receiver (RX) device 14. TX device 12 may send radio-frequency (RF) signals (e.g., quadrature amplitude modulated (QAM) signals) over communication link 16 to RX device 14. Communication channels 58 and 60 show the direction that RF signals travel when passing through communication link 16 from TX device 12 to RX device 14. In the example of FIG. 1, communication link 16 may be a wireless communication link. As described in more detail with respect to FIG. 3, communication link 16 may be considered as a model of a communication link with certain characteristics such as fading and noise characteristics.

TX device 12 may be a standalone transmitter device or may represent a component of a larger device, such as a network device, a mobile phone, a tablet computer, a broadband communication antenna, a satellite, or any other computing device capable of transmitting RF signals. TX device 12 includes baseband processor 18, digital-to-analog converter (DAC) 20, mixer 22, power amplifier 24, and antenna 26.

Baseband processor 18 represents a dedicated processor for managing radio communication functions of transmitter device 12. For example, baseband processor 18 may receive data (e.g., a bitstream that includes a plurality of bits) to be outputted by transmitter device 12 and may generate, modulate, and/or encode a digital baseband signal of the data to be outputted. Baseband processor 18 may perform channel coding functions, modulation functions, frequency shifting functions, QAM mapping functions, QAM rotation functions, and other radio functions on the data and baseband signal prior to outputting the baseband signal to DAC 20. Baseband processor 18 may be implemented as dedicated hardware, software, firmware, or some combination of hardware, software, and/or firmware. In each case, whether functions of baseband processor 18 are implemented in hardware, software, and/or firmware, underlying hardware is configured to execute any software and/or firmware.

Baseband processor 18 may output a generated baseband signal to DAC 20 which converts the digital baseband signal to a corresponding analog signal in preparation for mixing by mixer 22. Mixer 22 represents an up-mixer that may modulate an analog baseband signal up to one or more RF carrier signal frequencies for transmission (e.g., as one or more orthogonal frequency-division multiplexing (OFDM) carrier signals) over communication link 16. Power amplifier 24 may receive and boost one or more RF carrier signals generated by mixer 22 and TX device 12 may output the RF carrier signals via antenna 26. The RF carrier signals may travel via communication path 58 over communication link 16 to communication path 60. RX device 14 may be a standalone receiver device or may represent a component of a larger device, such as a network device, a mobile phone, a broadband communication antenna, a satellite, or any other computing device capable of receiving RF signals. RX device 14 includes baseband processor 36, analog-to-digital converter (ADC) 34, mixer 32, low-noise amplifier 30, and antenna 28.

Antenna 28 of RX device 14 may receive an RF carrier signal generated by TX device 12 at communication path 60. To determine data from RF carrier signals RX device 14 may perform the inverse process performed by TX device 12 to generate the RF transmission. For example, RX device 14 may receive one or more RF carrier signals at antenna 28. The one or more RF carrier signals may pass through to low-noise amplifier 30 which may boost the one or more RF carrier signals that, having passed through communication link 16, may be too weak to process without amplification. The amplified RF carrier signal may pass through mixer 32 which represents a down-mixer that may demodulate the one or more amplified RF (OFDM) carrier signals to produce a baseband signal. ADC converter 34 may receive the baseband signal from mixer 32 and convert the baseband signal from an analog signal to a digital signal that can be further processed into a usable data transmission by baseband processor 36.

Baseband processor 36 represents a dedicated processor for managing radio communication functions of transmitter device 12. For example, baseband processor 36 may receive a digital baseband signal originally outputted by transmitter device 12 and de-modulate, and/or decode the digital baseband signal into a received data transmission (e.g., a bitstream). Baseband processor 36 may further transmit the resulting bitstream to another processor of RX device 14 or some other device not shown in system 10. Baseband processor 36 may perform demodulation functions, frequency shifting functions, QAM demapping functions, QAM rotation functions, channel decoding functions, error correction functions, and other radio functions on the baseband signal and corresponding data prior to outputting the received data transmission. Baseband processor 36 may be implemented as dedicated hardware, software, firmware, or some combination of hardware, software, and/or firmware. In each case, whether functions of baseband processor 36 are implemented in hardware, software, and/or firmware, underlying hardware is configured to execute any software and/or firmware.

In the example of FIG. 1, communication link 16 is a wireless communication link between transmitter device 12 and receiver device 14. Communication link 16, however, should not be limited to wireless links but may include links made of other media capable of supporting the simultaneous transmission of one or more RF (e.g., OFDM) carrier signals, including but not limited to physical mediums such as fiber optic links, coaxial links, and copper links. Depending on the medium used, a RF carrier signal transmitted over communication link 16 may be susceptible to an amount of signal fade "ρ" and/or noise "n" which may cause some amount of signal degradation to an RF carrier signal from the time the RF carrier signal travels from communication path 58 and to the time the RF carrier signal travels to communication path 60. As is explained in further detail below, since each carrier signal may experience a unique amount of fade "ρ" and noise "n," the received signal (i.e., the signal received by RX device 14) may be different than the transmitted signal (i.e., the signal transmitted by TX device 12).

System 10 of FIG. 1 utilizes QAM constellation techniques, such as rotated QAM constellation techniques, to transmit data as one or more QAM symbols from TX device 12 through communication link 16 to RX device 14. For example, baseband processor 18 of TX device 12 may include a QAM mapper that encodes a data transmission (e.g., the bitstream) into one or more QAM symbols (e.g., one QAM symbol represents a plurality of bits of the bitstream). For rotated QAM constellation techniques, baseband processor 18 may further include a rotator unit that rotates the QAM symbols prior to transmission. TX 12 may transmit these one or more QAM symbols on OFDM carrier signals through communication link 16. For example, each subcarrier of the OFDM signals is modulated to carry QAM symbols. RX 14 may receive the QAM symbols via the OFDM carrier signals. Baseband processor 36 of RX 14 may decode the one or more QAM symbols into the data transmission (e.g., the bitstream). For example, baseband processor 36 may include a rotated QAM demapper (e.g., a soft demapper and/or a hard demapper) that determines, for soft demapping, a plurality of log-likelihood (LLR) values for a plurality of bit positions based on the received QAM symbols according to the techniques of this disclosure. Alternatively, hard demapping may be used, and is also described in more detail below. In the techniques described in this disclosure, each LLR value is associated with one bit of the plurality of bits of the bitstream.

As described in more detail, the rotated QAM demapper of baseband processor 36 may receive a symbol that represents a transmitted symbol. The transmitted symbol may indicate a plurality of bits. The rotated QAM demapper may determine a vector location of the received symbol within a QAM constellation.

In general, a QAM constellation is a Cartesian map of a discrete quantity (generally a power of two) of mapped QAM symbols. In other words, the $\log_2$ of the number of mapped QAM symbols is equal to an integer value. However, the techniques described in this disclosure are not so limited.

One axis (e.g., the horizontal axis) of a QAM constellation corresponds to an in-phase (I) component of a QAM symbol and the other axis (e.g., the vertical axis) corresponds to the quadrature (Q) component of a QAM symbol. An "M" QAM constellation indicates that a received symbol can map to a discrete quantity of M mapped symbols in the constellation. For example, sixty-four particular symbols are mapped within a 64-QAM constellation, two hundred fifty-six particular symbols are mapped within a 256-QAM constellation, etc.

The "M" value may indicate the number of bits that each mapped QAM symbol can indicate. For example, each symbol of a 16-QAM constellation indicates a unique 4 bit value (i.e., $2^4$ equals 16). In other words, for a 16-QAM constellation, each symbol represents a value between 0000 to 1111, and no two symbols represent the same value.

The QAM symbol transmitted by TX device 12 (e.g., the symbol outputted through communication link 16) includes an I component and a Q component. The vector produced by the I and Q components refers to one mapped symbol in the QAM constellation. For example, assume that a mapped QAM symbol is located at (1, 1) within the QAM constellation. In this example, if the amplitude of the I and Q components is each 1, then the I and Q components refer to the QAM symbol located at (1, 1) within the QAM constellation, and the QAM symbol located at (1, 1) is a distance of square-root of 2 (sqrt(2)) away from the origin of the QAM constellation (i.e., sqrt($1^2+1^2$)). In some examples, the QAM constellations are normalized such that the average power is equal to one.

In QAM constellation techniques, TX device 12 may transmit the I and Q components of a QAM symbol on a same subcarrier of the OFDM subcarriers. However, it may be beneficial to transmit the I and Q components on different subcarriers to reduce the chances that the I and Q components are negatively impacted by noise and fading by the same amount. In some examples, TX device 12 and RX device 14 may implement rotated QAM constellation techniques.

Rotated QAM constellation techniques are signal modulation techniques used in order to obtain signal-space diversity (SSD), also known as modulation diversity or coordinate interleaving. For example, TX device 12 rotates a QAM symbol by a fixed angle prior to transmission. To rotate a QAM symbol, TX device 12 delays one of the I or Q component of the QAM symbol. This delay causes the I and Q components of the QAM symbol to be transmitted on different subcarriers and at slightly different times. RX device 14 then removes the delay (e.g., adds delay to the other one of the I and Q components) so that the I and Q components align and can be mapped to the rotated QAM constellation.

The rotated QAM constellation may be similar to the non-rotated QAM constellation, but may be rotated by a fixed angle. For example, each mapped symbol of the rotated QAM constellation may be rotated by the fixed angle relative to corresponding mapped symbols of the non-rotated QAM constellation. The spectral efficiency of the rotated QAM constellation may be the same as that for non-rotated QAM constellation since the rotated QAM constellation includes I and Q components for different QAM symbols that are combined into a single complex symbol. However, rotated QAM constellation techniques may improve performance for high rates or when communication link 16 is susceptible to the erasure phenomena. For example, if the I and Q components are transmitted on different subcarriers, the chances that both will experience the erasure phenomena may be minimized. In this way, the likelihood that noise and/or fade will degrade both the I and Q components is reduced. Rather, with rotated QAM, a more likely scenario is that either the I or Q component may experience degradation, but not both (or at least the components may experience degradation by different amounts). In the case when one of the components of the received symbol is corrupted, both the I and Q components individually may include sufficient information from which RX device 14 can determine the plurality of bits indicated by the transmitted symbol.

Rotated constellation techniques have been considered for long-term evolution (LTE), LTE Advanced (LTE-A), and is currently adapted in the next generation digital video broadcasting standard for terrestrial transmission (DVB-T2). Cellular telephony may also potentially utilize rotated constellation techniques. The techniques described in this disclosure may be considered as being applicable to LTE, LTE-A, DVB-T2, and cellular telephony. Accordingly, the disclosure contemplates wireless communication devices, such as wireless phones, wireless handsets, smartphones, tablets, and wireless infrastructure, which make use of the techniques of this disclosure. However, the techniques are not so limited, and may be used generally in any system for transmitting and receiving bitstreams, including techniques that do not necessarily require a rotated constellation.

For purposes of description, the techniques are described with respect to rotated QAM constellation techniques. However, the techniques described in this disclosure are not limited to rotated QAM constellation techniques, and may be used in systems where the QAM constellation is not rotated.

As described above, TX device 12 may transmit the QAM symbol (e.g., the I and Q components of the QAM symbol) on different subcarriers for the rotated QAM constellation techniques. Baseband processor 36 may extract from the subcarriers and combine the I and Q components to form a received QAM symbol. However, the received QAM symbol and the transmitted QAM symbol may be different.

In the techniques described in this disclosure, the rotated QAM demapper may plot the received symbol on a rotated QAM constellation. For example, baseband processor 18 of TX device 12, and baseband processor 36 of RX device 14 may each store identical rotated QAM constellations, and the rotated QAM demapper of baseband processor 36 may plot the received symbol on its rotated QAM constellation. The vector location corresponding to the received symbol may or may not correspond to a mapped symbol of the QAM constellation (e.g., the vector location may represent a point of the QAM constellation in-between two or more mapped symbol locations).

For example, because the subcarriers are susceptible to fade and noise, the received QAM symbol may not map to a location of a mapped QAM symbol in the rotated QAM constellation. For instance, the transmitted QAM symbol, which indicates a plurality of bits, maps to a QAM symbol on the QAM constellation, but the received symbol may not correctly map to a QAM symbol of the QAM constellation due to signal fading and noise. Accordingly, baseband processor 36 may not be able to determine the plurality of bits indicated by the transmitted QAM symbol from the received symbol.

The rotated QAM demapper of baseband processor 36 may define points of the QAM constellation around the vector location based on a probability density function applied to the vector location. For instance, the rotated QAM demapper of baseband processor 36 may apply a probability density function to the vector location of the received symbol. The probability density function may in some examples represent a Gaussian probability density function that assigns a probability to each point around the vector location that indicates a likelihood that the point actually represents a closer approximation of the vector location. The rotated QAM demapper may determine the points on the probability density function. For a M-QAM constellation, the rotated QAM soft demapper may determine 2*sqrt(M) points in some examples.

The rotated QAM demapper of baseband processor 36 may map the points to corresponding mapped symbols of the rotated QAM constellation for determining the plurality of bits based on the corresponding mapped symbols. For example, the rotated QAM demapper may determine a mapped symbol that shares a location of the QAM constellation nearest to each of the points. In some examples, the rotated QAM demapper may utilize a look-up table to determine the closest mapped symbol for each of the points.

For soft demapping, with one or more mapped symbols determined from the received QAM symbol and the probability density function, the rotated QAM demapper of baseband processor 36 may determine a log-likelihood ratio (LLR) value for each bit position of the plurality of bits. In other words, the QAM demapper of baseband processor 36 may determine a plurality of LLR values, where each LLR value is associated with each bit position of the plurality of bits. The rotated QAM demapper of baseband processor 36 may output the plurality of LLR values. Baseband processor 36 may include a decoder that converts the LLR values from the rotated QAM soft demapper into a plurality of bits representative of the data transmission originally encoded by TX device 12.

For hard demapping, with the one or more mapped symbols determined from the received QAM symbol and the probability density function, the rotated QAM demapper of baseband processor 36 may identify one of the mapped symbols. For example, the rotated QAM demapper may identify the mapped symbol from the determined mapped symbol that is closest to the received symbol. The rotated QAM demapper or the decoder may determine the plurality of bits associated with the identified mapped symbol.

As described above, for soft demapping, baseband processor 36 (e.g., the demapper of baseband processor 36) may determine a log-likelihood ratio (LLR) value for each bit of the plurality of bits represented by the transmitted QAM symbol. The following equations describe ways in which baseband processor 36 may determine the LLR values for the plurality of bits.

$$LLR(b_i) = \ln\left\{\frac{Pr(\hat{I}, \hat{Q} | b_i = 0)}{Pr(\hat{I}, \hat{Q} | b_i = 1)}\right\} = \ln\left\{\frac{\sum_{x \in c_i^0} e^{-\frac{\rho_I^2(\hat{I}-I_x)^2+\rho_Q^2(\hat{Q}-Q_x)^2}{2\sigma^2}}}{\sum_{x \in c_i^1} e^{-\frac{\rho_I^2(\hat{I}-I_x)^2+\rho_Q^2(\hat{Q}-Q_x)^2}{2\sigma^3}}}\right\} \quad (1.1)$$

In equation 1.1, $LLR(b_i)$ is the log-likelihood ratio for bit i, $c_i^0$ and $c_i^1$ are the subset of constellation points belonging to hypothesis 0 and 1, respectively, for bit i of the plurality of bits. $\hat{I}$ and $\hat{Q}$ are the I and Q components, respectively, of the received symbol (after equalization). $I_x$ and $Q_x$ are the coordinates of mapped symbols of the rotated QAM constellation. For example, for a 16-QAM, x for $I_x$ and $Q_x$ is $1 \leq x \leq 16$. The fade in the I and Q channels is given by $\rho_I$ and $\rho_Q$, respectively, and $\sigma^2$ is the variance of additive white Gaussian random variable noise with zero mean.

In other words, from equation 1.1, the demapper of baseband processor 36 may compute a plurality of metrics, one metric for each mapped QAM symbol of the QAM constellation. For example, as shown in equation 1.1, the demapper of baseband processor 36 may compute $\rho_I^2(\hat{I}-I_x)^2+\rho_Q^2(\hat{Q}-Q_x)^2$ (which may be considered as a value indicative of the distance between the received QAM symbol and a mapped QAM symbol). Computing $\rho_I^2(\hat{I}-I_x)^2+\rho_Q^2(\hat{Q}-Q_x)^2$ for one value of x may be considered as computing one metric. For example, if the demapper of baseband processor 36 were to compute $\rho_I^2(\hat{I}-I_x)^2+\rho_Q^2(\hat{Q}-Q_x)^2$ for each QAM symbol of a 64-QAM constellation, the demapper of baseband processor 36 may perform 64 metric calculations.

In some cases, it may be complicated for the demapper of baseband processor 36 to implement equation 1.1. To reduce the complexity of the calculation, the demapper of baseband processor 36 may utilize the Max-Log approximation. The Max-Log approximation indicates that the $\ln(e^{a1} + \ldots e^{ak})$ is approximately equal to the $\max_{i=1 \ldots k}(a_i)$. Accordingly, equation 1.1 may simplify to:

$$LLR(b_i) \approx \frac{1}{2\sigma^2}\left[\begin{array}{l}\min_{x \in c_i^1}\rho_I^2(\hat{I}-I_x)^2 + \rho_Q^2(\hat{Q}-Q_x)^2 - \\ \min_{x \in c_i^0}\rho_I^2(\hat{I}-I_x)^2 + \rho_Q^2(\hat{Q}-Q_x)^2\end{array}\right] \quad (1.2)$$

In equation 1.2, similar to equation 1.1, the metric calculation is $\rho_I^2(\hat{I}-I_x)^2+\rho_Q^2(\hat{Q}-Q_x)^2$, which the demapper of baseband processor 36 implements for each symbol of the QAM constellation. In other words, in equation 1.2, the demapper of baseband processor 36 may compute $\rho_I^2(\hat{I}-I_x)^2+\rho_Q^2(\hat{Q}-Q_x)^2$ for each mapped symbol. In this disclosure, the equation $\rho_I^2(\hat{I}-I_x)^2+\rho_Q^2(\hat{Q}-Q_x)^2$ may be referred to as equation 1.3.

The demapper of baseband processor 36 may then determine the minimum for all mapped symbols that correspond to the hypothesis of 1, determine the minimum for all mapped symbols that correspond to the hypothesis of 0, and subtract the two values to determine the LLR for the bit. In the techniques described in this disclosure, the demapper of baseband processor 36 may implement equation 1.2 because implementing equation 1.2 may be less processing intensive than implementing equation 1.1, and may provide substantially similar results.

Moreover, equation 1.1 and equation 1.2 are based on the fading (i.e., $\rho_I$ and $\rho_Q$). There may be various ways in which baseband processor 36 may determine the value of $\rho_I$ and $\rho_Q$, and the techniques described in this disclosure are not limited to any particular way of determining $\rho_I$ and $\rho_Q$. One example technique for determining $\rho_I$ and $\rho_Q$ is using pilot or preamble symbols. The pilot or preamble symbols are known to both baseband processor 18 and baseband processor 36. Baseband processor 36 may receive the pilot or preamble symbols, and compare the received pilot or preamble symbols with the known values of the pilot and preamble symbols. Baseband processor 36 may then determine the values of $\rho_I$ and $\rho_Q$ based on the comparison. Again, other techniques to determine the fading may be possible, such as decision directed methods, and techniques described in this disclosure should not be considered limited to the provided example technique.

In the above examples with respect to equations 1.1 and 1.2, the demapper of baseband processor 36 may compute a metric for every single mapped QAM symbol in the QAM constellation. While computing a metric for every single mapped QAM symbol may ensure that the LLR value is accurate to determine the plurality of bits, the number of metric computations may be daunting. In accordance with the techniques described in this disclosure, rather than computing a metric for every single mapped QAM symbol, the demapper of baseband processor 36 may compute a metric for a subset of the mapped QAM symbols of the QAM constellation.

For example, as described above, the demapper of baseband processor 36 may determine a probability density function (PDF). The probability density function may be centered around the received symbol, and may be a Gaussian probability density function. In accordance with the techniques described in this disclosure, the demapper of baseband processor 36 may determine the probability density function based on the fading (i.e., $\rho_I$ and $\rho_Q$). The demapper of baseband processor 36 may determine points along the probability density function, and may determine a subset of the mapped QAM symbols based on the determined points.

In this example, the subset of the mapped QAM symbols is less than the total number of mapped QAM symbols. The demapper of baseband processor 36 may implement equation 1.2 utilizing the mapped QAM symbols in the subset of the mapped QAM symbols (e.g., only the mapped QAM symbols in the subset of the mapped QAM symbols, and no other QAM symbols). In this way, by utilizing the probability density function, the techniques described in this disclosure may reduce the number of metric computations as compared to other techniques that compute a metric for every single QAM symbol in the QAM constellation. Determining the LLR values in this way may be considered as computing Max-Log LLR values; however, only a subset of QAM symbols are used, rather than every single QAM symbol. The techniques that utilize all QAM symbols for determining the Max-Log LLR values may be referred to as using a full Max-Log LLR algorithm.

Moreover, utilizing the probability density function, which is based on the fading, to compute the LLR values results in substantially the same LLR values if the demapper of baseband processor 36 were to compute metrics for every single QAM symbol. For example, implementing equation 1.1 for every single mapped symbol may be referred to as a brute force or full log-likelihood ratio (full LLR) and implementing equation 1.2 for every single mapped symbol may be referred to as a brute force or full Max-Log LLR, as described above. In the techniques described in this disclosure, utilizing the probability density function to determine a subset of mapped symbols for determining the LLR values may provide substantially the same result as determining the LLR values utilizing the full Max-Log LLR. Accordingly, the techniques described in this disclosure may provide the same performance as the full Max-Log LLR, but with substantially fewer computations, which promotes efficiency.

Some other techniques (i.e., other than those described in this disclosure) have been proposed to reduce the number of metric computations. For example, in these other techniques, the demapper of baseband processor 36 may divide the QAM constellation into fixed sub-regions. An example of division of a constellation into these fixed sub-regions is provided in FIG. 10.

Figure 10:
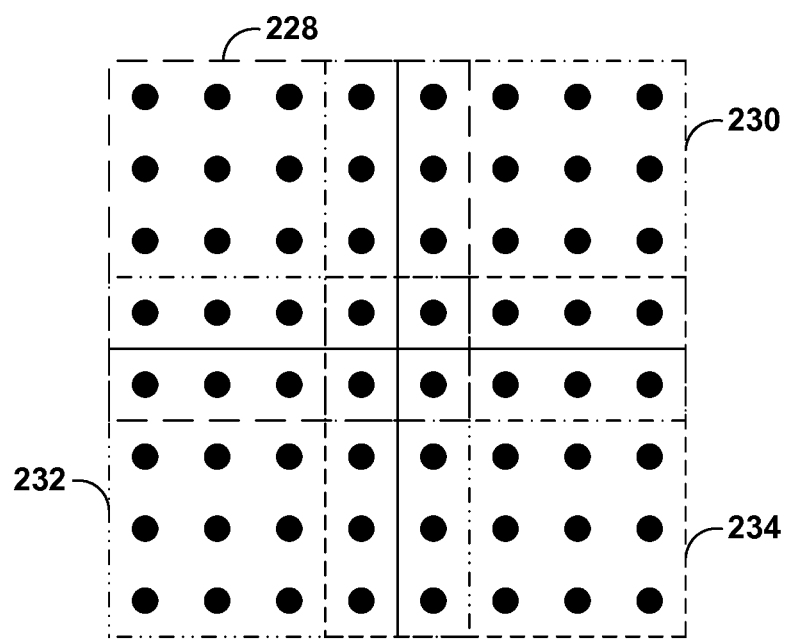
FIG. 10 is a conceptual diagram illustrating sub-regions of a QAM constellation.

For the example of FIG. 10, the demapper of baseband processor 36 may determine the sub-region to which received QAM symbol belongs. The demapper of baseband processor 36 may compute metrics, such as those for equation 1.2, for the QAM symbols only within the sub-region. However, because the sub-regions are fixed, the locations of the sub-regions within the QAM constellation are not based on, and do not take into account, the fading. In other words, the demapper of baseband processor 36 selects the sub-region based only on the location of the received symbol, and not the fading.

Because sub-regions are fixed, in these other techniques, without accounting for the fading, the computed LLR values are different than those in accordance with the full LLR or full Max-Log LLR techniques. In other words, while the sub-region technique may reduce the number of metric computations, the performance is sub-optimal because the resulting LLR values are not the same as the LLR values if the full LLR or full Max-Log LLR techniques were utilized. However, as described above, the techniques described in this disclosure provide performance comparable, if not the same, as the full Max-Log LLR techniques, while reducing the number of metric computations, as compared to the full LLR or full Max-Log LLR, and in some cases the sub-region techniques.

The sub-region techniques of FIG. 10 and the techniques described in this disclosure should not be confused with one another. As described above, the sub-regions in FIG. 10 are pre-determined and fixed. However, the demapper of baseband processor 36 determines a probability density function to identify a subset of mapped symbols of the QAM constellation for use in soft demapping. For example, the demapper of baseband processor 36 may determine the probability density function based on the amount of fading. The sub-regions are not necessarily centered around the received QAM symbol, whereas the determined probability density function may be centered around the received QAM symbol. In general, the sub-regions are not determined based on probability density functions, much less Gaussian probability density functions.

Furthermore, in the sub-region technique, the demapper of baseband processor 36 computes metrics for each mapped symbol within the sub-region. In the techniques described in this disclosure, the demapper of baseband processor 36 may first determine points along the probability density function, then determine mapped QAM symbols from the determined points, and determine the LLR values from these determined mapped QAM symbols (e.g., a subset of the all of the QAM symbols). The sub-region technique performs no such determination of points along a probability density function, or determining mapped QAM symbols from the determined points.

Figure 2:
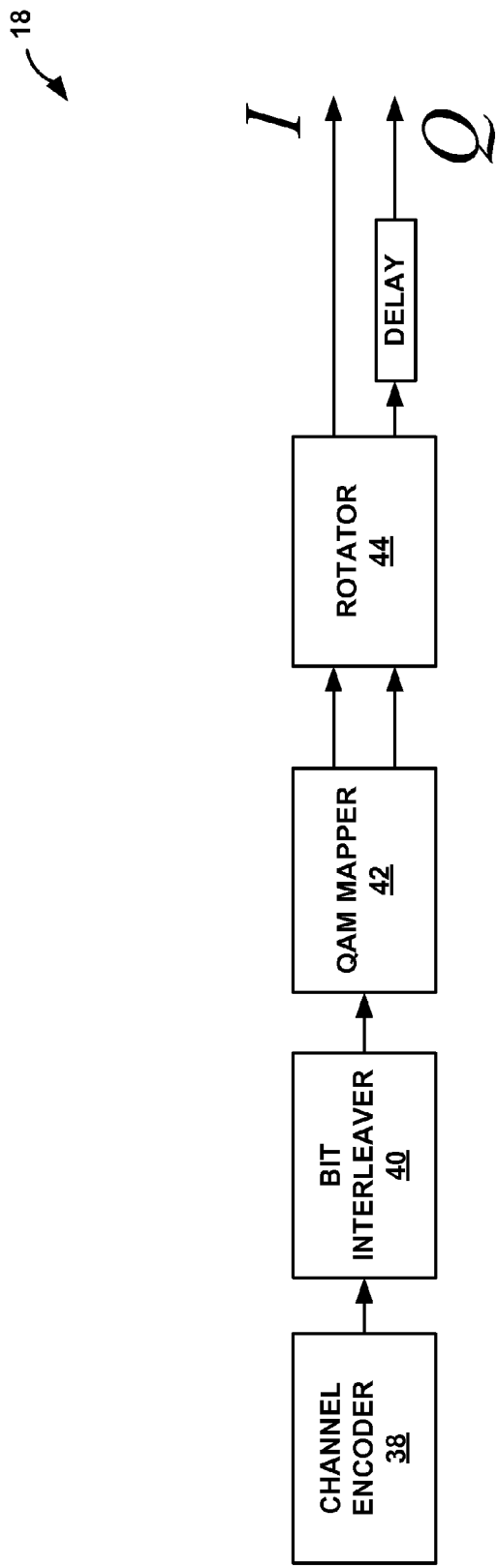
FIG. 2 is block diagram illustrating a simplified example of a baseband processor of the transmitter device shown in FIG. 1.

FIG. 2 is block diagram illustrating baseband processor 18 of transmitter device 12 shown in FIG. 1. Baseband processor 18 of FIG. 2 includes channel encoder unit 38, bit interleaver unit 40, QAM mapper unit 42, and rotator unit 44. For purposes of illustration, FIG. 2 is described within the context of TX device 12, communication link 16, and RX device 14 of FIG. 1. Units 38-44 may be implemented as individual and/or multiple circuits, individual and/or integrated chips, dedicated hardware, software, firmware, or some combination of hardware, software, and/or firmware, circuits and integrated chips. In each case, whether the functions are implemented in hardware, software, and/or firmware, underlying hardware is configured to execute any software and/or firmware.

TX device 12 receives a bitstream for transmission to RX device 14. The bitstream may pass through channel encoder unit 38 where the bit stream is encoded (e.g., with a rate amount, a constraint amount, etc.) and then bit-by-bit interleaved by bit interleaver unit 40. The encoded and interleaved bit stream may be received by QAM mapper unit 42. QAM mapper unit 42 represents a QAM mapper that converts a bitstream into one or more QAM symbols of a M-QAM constellation. QAM mapper unit 42 may determine a symbol of a M-QAM constellation that corresponds to the encoded and interleaved bit stream. Rotator unit 44 may receive the QAM symbol as an output from QAM mapper unit 42 and rotate the QAM symbol by a pre-determined angle. In other words, rotator unit 44 may rotate the QAM symbol by a fixed angle such that when RX 14 receives the rotated QAM symbol, RX device 14 uses the same fixed angle to decode the rotated QAM symbol. Rotator unit 44 may output the now-rotated QAM symbol (e.g., to mixer 22). The QAM symbol may have both an in-phase component I, and a quadrature component Q. FIG. 2 illustrates the Q component of the QAM symbol (I, Q) being delayed by an amount to illustrate that conceptually, and by design, by rotating the QAM symbol, the in-phase component and the quadrature component of the QAM symbol are now slightly out of phase. The delay may cause the I and Q components of the rotated QAM symbol to be carried by different subcarriers. However, any other one-to-one mapping scheme could be used.

The QAM symbol is outputted by baseband processor 18 to DAC 20, mixer 22, etc. of TX device 12 (FIG. 1). TX device 12 transmits the rotated QAM symbol over two OFDM subcarrier signals through communication link 16. One subcarrier signal corresponds to the in-phase component I and the other subcarrier signal corresponds to the quadrature component Q. For example, if a QAM symbol is denoted as I1+jQ1, I2+jQ2, and so forth, then one subcarrier can hold I1+jQ2, another subcarrier can hold I2+jQ3, and so forth. Accordingly, the I component and the Q component of one symbol (e.g., I2 and Q2 of a symbol) are carried by different subcarriers (e.g., as indicated in the example, a first subcarrier carries the Q2 component of the symbol, and a second subcarrier carries the 12 component of the symbol).

Figure 3:
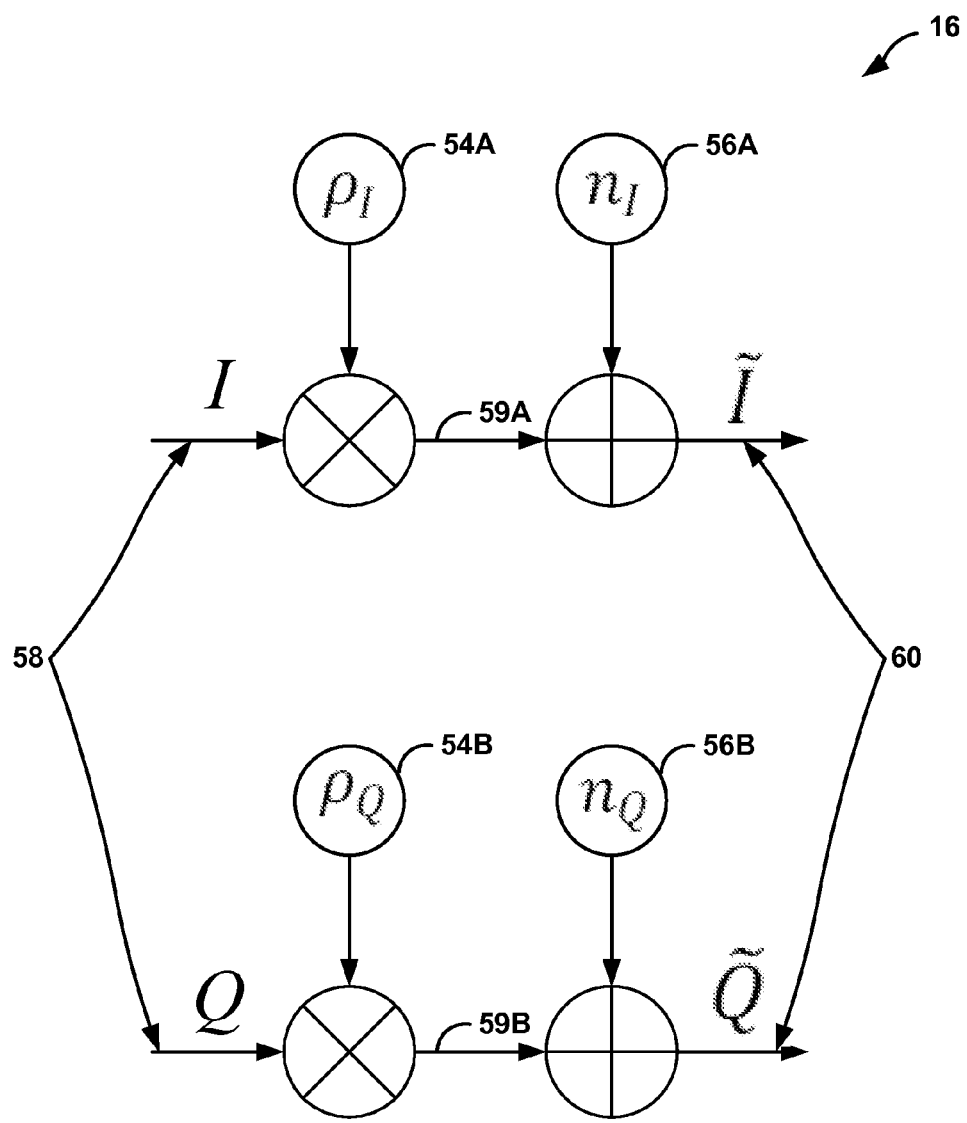
FIG. 3 is conceptual diagram illustrating further details of the example communication link shown in FIG. 1.

FIG. 3 is conceptual diagram illustrating further details of communication link 16 shown in FIG. 1. FIG. 3 may be considered as illustrating a model of communication link 16.

Communication link 16 may be a wireless communication link between TX device 12 and RX device 14. For purposes of illustration, FIG. 3 is described within the context of TX device 12, communication link 16, and RX device 14 of FIG. 1. Again, communication link 16 being a wireless communication link is provided for purposes of illustration and should not be considered limiting.

FIG. 3 illustrates the QAM symbol being transmitted as two OFDM subcarrier signals over the same communication path 58 through communication link 16 to communication path 60. As the subcarrier signal corresponding to the in-phase component I of the QAM symbol travels through communication link 16, the in-phase subcarrier signal I experiences an amount of fade 54A and an amount of noise 56A. The resultant subcarrier signal that is outputted on communication path 60, having an amount of fade "$\rho_I$" 54A and an amount of noise "$n_I$" 56A is designated as I~. Likewise, as the subcarrier signal corresponding to the quadrature component Q of the QAM symbol travels through communication link 16, the quadrature carrier signal Q experiences an amount of fade "$\rho_Q$" 54B and an amount of noise "$n_Q$" 56B. The resultant subcarrier signal that is outputted on communication path 60, having an amount of fade 54B and an amount of noise 56B is designated as Q~. In other words, as a QAM symbol (I, Q) is passed through communication link 16, the OFDM subcarrier signals corresponding to the I and Q components of the QAM symbol each experience some amount of fade "$\rho$" and/or noise "n" (which may be different for each of the components). In some examples, the noise is identically distributed.

Figure 4:
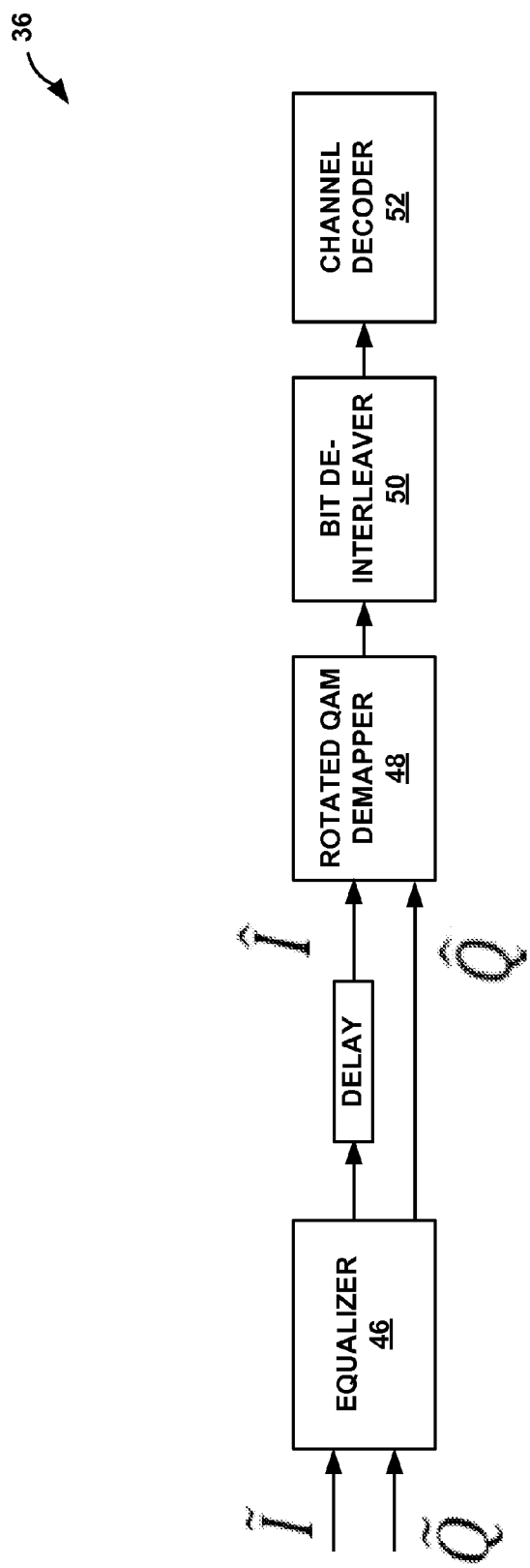
FIG. 4 is block diagram illustrating an example baseband processor of the receiver device shown in FIG. 1.

FIG. 4 is block diagram illustrating baseband processor 36 of receiver device 14 shown in FIG. 1. Baseband processor 36 of FIG. 4 includes equalizer unit 46, rotated QAM demapper 48, bit de-interleaver unit 50, and channel decoder unit 52. For purposes of illustration, FIG. 4 is described within the context of TX device 12, communication link 16, and RX device 14 of FIG. 1. Units 46-52 may be implemented as individual and/or multiple circuits, individual and/or integrated chips, dedicated hardware, software, firmware, or some combination of hardware, software, and/or firmware, circuits and integrated chips. In each case, whether the functions are implemented in hardware, software, and/or firmware, underlying hardware is configured to execute any software and/or firmware.

The techniques described in this disclosure are related to operations performed by a rotated QAM demapper (e.g., rotated QAM demapper unit 48) for optimally and efficiently determining a plurality of bits indicated by a transmitted QAM symbol. For example, for soft demapping, rotated QAM demapper unit 48 may determine an LLR value for each bit of a plurality of bits based on mapped QAM symbols. For example, rotated QAM demapper unit 48 may compute a plurality of metrics based on the mapped QAM symbols, and determine the LLR values for each of the bits based on the computed metrics. However, rather than computing metrics for each mapped QAM symbol, rotated QAM demapper unit 48 may determine a subset of mapped QAM symbols, and determine LLR values based on the subset of mapped symbols (e.g., compute metrics from the subset of mapped symbols and determine the LLR values from the subset of mapped symbols). Rotated QAM demapper 48 is one example of the demapper of baseband processor 36 described above with respect to FIG. 1.

RX device 14 may receive two OFDM subcarrier signals corresponding to faded and/or noisy QAM symbol (I~, Q~). Baseband processor 36 may receive QAM symbol (I~, Q~) which passes through equalizer unit 46 (e.g., a zero-forcing equalizer to compensate for attenuation and phase shift in each data carrier signal). The compensated QAM symbol has the inherent delay between the in-phase components and the quadrature components removed, resulting in QAM symbol having components (I^, Q^). Rotated QAM demapper unit 48 may receive QAM symbol (I^, Q^) and, in accordance with techniques of this disclosure, rotated QAM demapper unit 48 may perform rotated QAM demapping techniques to determine a plurality of bits and/or a plurality of LLR values associated with a plurality of bits based on received QAM symbol (I^, Q^). Rotated QAM demapper unit 48 may output the plurality of bits and/or the plurality of LLR values associated with a plurality of bits to bit de-interleaver unit 50 and channel decoder unit 52 for determining the actual data transmission represented by the transmitted QAM symbol.

Figure 5:
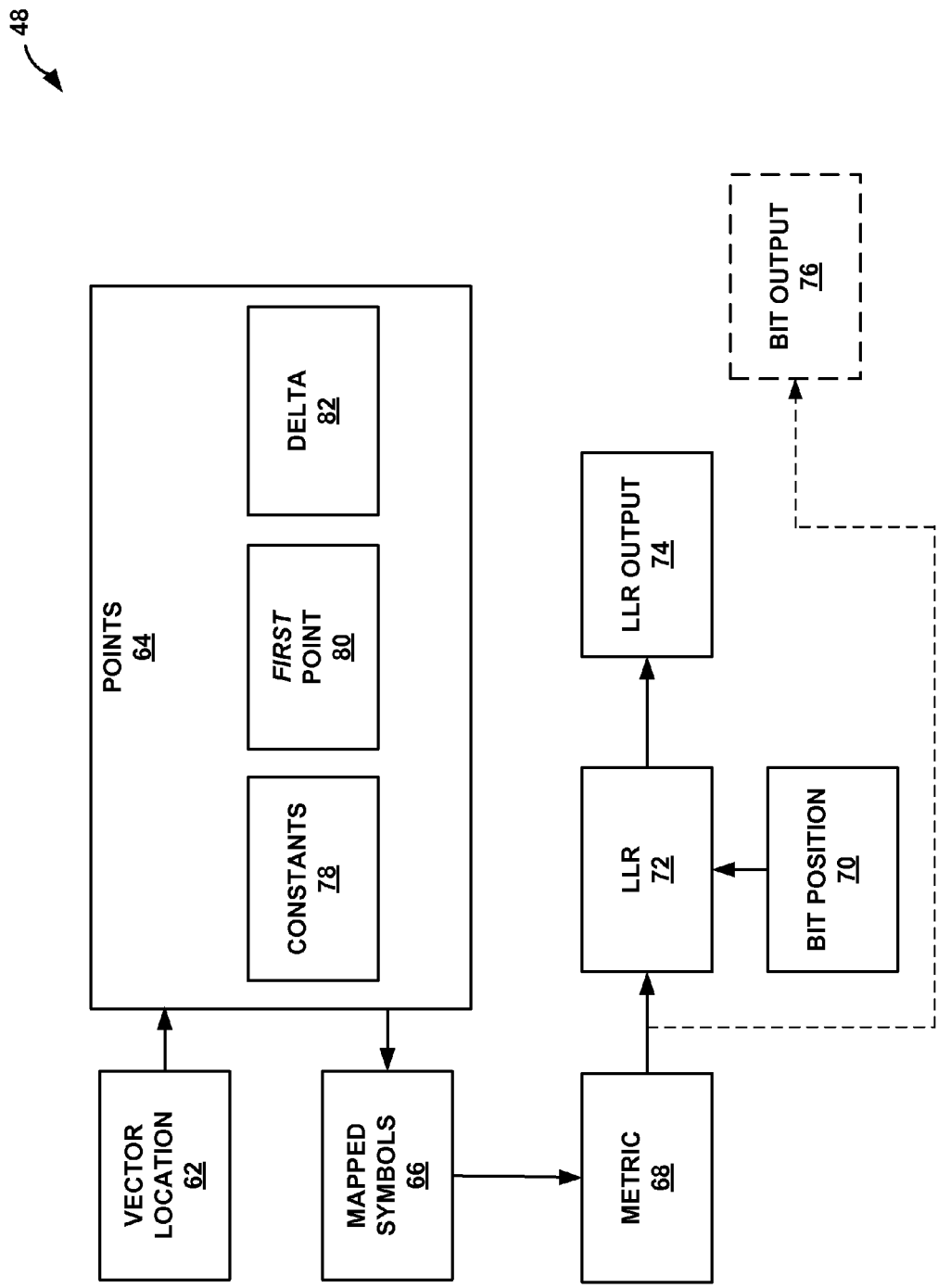
FIG. 5 is block diagram illustrating an example rotated QAM demapper unit of the baseband processor shown in FIG. 3.

FIG. 5 is block diagram illustrating rotated QAM soft demapper unit 48 (hereinafter referred to as demapper unit 48) of baseband processor 36 shown in FIG. 3. Demapper unit 48 of FIG. 5 includes units vector location unit 62, points unit 64, mapped symbols unit 66, metric unit 68, bit position unit 70, LLR unit 72, LLR output unit 74, and (optional) bit output 76. Another option to compute the bits is simply to slice the LLR output from unit 74. Although described in this example as a soft demapper, the techniques performed by demapper unit 48 could also apply to a hard demapper. In the optional case of hard demapping, bit output unit 76 is shown, and demapper unit 48 need not necessarily include bit position unit 70, LLR unit 72, and LLR output unit 74 (although it may be possible that demapper unit 48 still includes these units). Unit 64 includes constants unit 78, first point unit 80, and delta unit 82. Units 62-82 may be implemented as individual and/or multiple circuits, individual and/or integrated chips, dedicated hardware, software, firmware, or some combination of hardware, software, firmware, circuits and/or integrated chips. In each case, whether the functions are implemented in hardware, software, and/or firmware, underlying hardware is configured to execute any software and/or firmware.

For illustration, FIG. 5 is described below within the context of system 10 of FIG. 1 and baseband processor 36 of FIG. 3. In addition, FIG. 5 is described below within the context of rotated QAM constellation 100 of FIG. 6.

Figure 6:
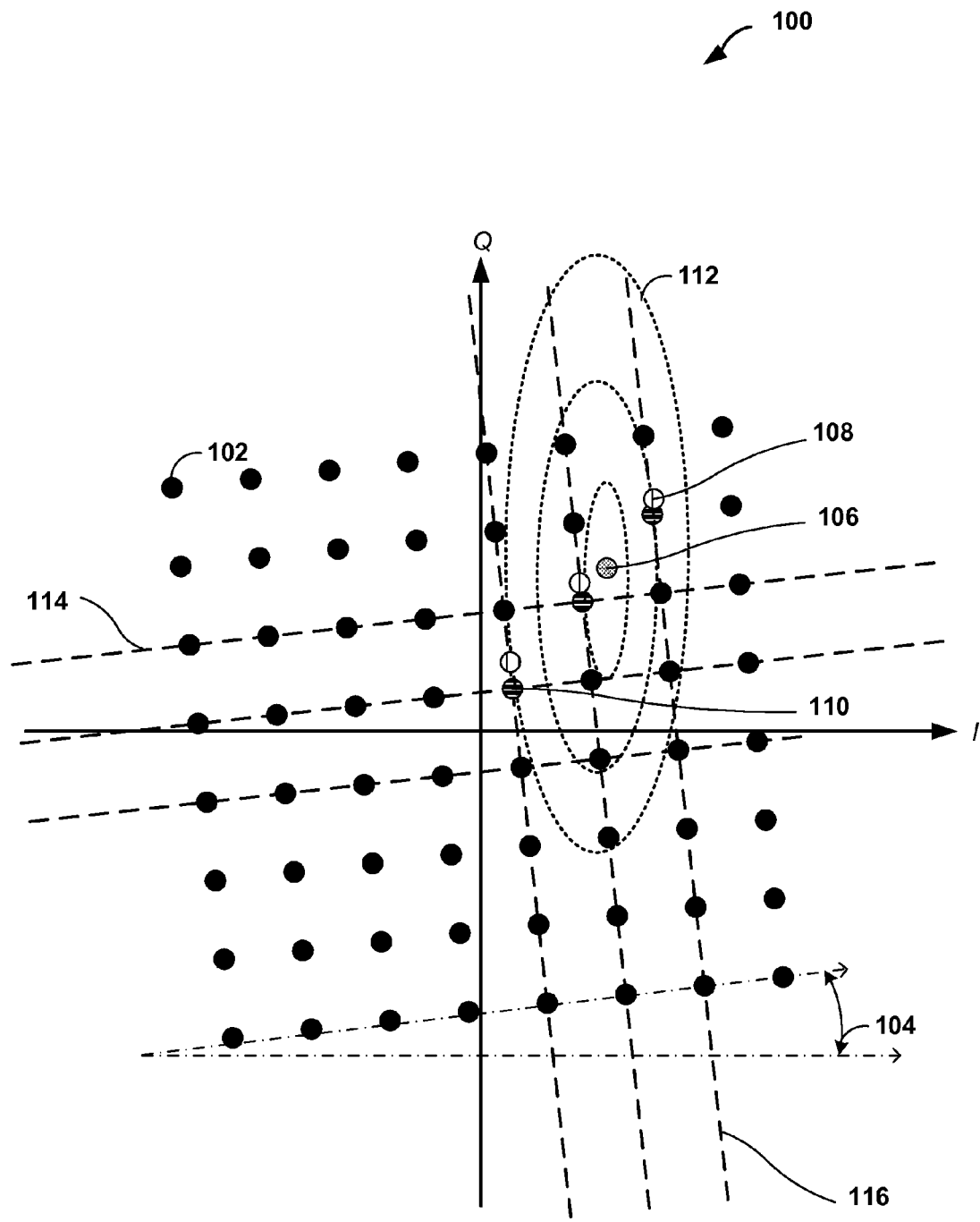
FIG. 6 is conceptual diagram illustrating techniques for determining a plurality of log-likelihood ratio (LLR) values from a rotated QAM constellation, in accordance with one or more aspects of the present disclosure.

FIG. 6 is conceptual diagram illustrating techniques for determining a plurality of LLR values from rotated QAM constellation 100, in accordance with one or more aspects of the present disclosure. FIG. 6 illustrates a 64-QAM rotated constellation (i.e., M equals 64). The 64-QAM rotated constellation comprises sixty-four mapped symbols 102 (shown as black circles). The rotated QAM constellation has a rotation angle ø 104. The vertical axis of the rotated QAM constellation represents the quadrature component Q and the horizontal axis represents the in-phase component I.

According to the techniques of this disclosure, demapper unit 48 may receive symbol (I^, Q^). Received symbol (I^, Q^) may represent a transmitted QAM symbol (I, Q) that indicates a plurality of bits (e.g., transmitted from TX device 12). In some examples, received symbol (I^, Q^) may include an amount of fade and/or an amount of noise at the respective in-phase and quadrature components (I^, Q^). For instance, depending on the environment of communication link 16 that transmitted the OFDM subcarrier signals which carried the received symbol (I^, Q^), the in-phase component and the quadrature component of the received symbol (I^, Q^) may each respectively comprise some amount of inherent fade "p" and/or noise "n." The fade and noise of the in-phase component I^ are designated herein as $\rho_I$ and $n_I$ and the fade and noise of the quadrature component Q^ are designated herein as $\rho_Q$ and $n_Q$.

Vector location unit 62 of demapper unit 48 may determine vector location 106 of received symbol (I^, Q^). For example, FIG. 6 illustrates vector location 106 plotted against the I and Q axis of rotated QAM constellation 100. In other words, vector location unit 62 of demapper unit 48 may have determined that the received symbol is located at vector location 106 illustrated in FIG. 6. Vector location unit 62 may determine vector location 106 based on the in-phase and quadrature phase components of the received symbol. For example, vector location 106 may represent the relative position of the received symbol at rotated QAM constellation 100. Rotated QAM constellation 100 may be identical to the QAM constellation used by QAM mapper 42 and rotator 44 shown in FIG. 2 of TX device 12. That is to say, rotation angle ø 104 shown in FIG. 6 is the same amount ø of rotation applied to the transmitted QAM symbol (I, Q) prior to transmission over communication link 16.

Based on vector location 106, points unit 64 of demapper 48 may define points 108 of QAM constellation 100 around vector location 106 based on a probability density function applied to vector location 106. In other words, to determine which subset of mapped symbols 102 on rotated QAM constellation 100 to use for determining the LLR values, points unit 64 may utilize a probability density function applied to vector location 106. The mapped symbols 110 may be nearest the locations of points 108 of QAM constellation 100 around vector location 106. Each one of points 108 may or may not correspond to an actual location of a mapped symbol of rotated QAM constellation 100. It should be understood that for illustration purposes only, three points 108 are shown in FIG. 6 and demapper 48 may determine more than three and/or fewer than three points 108 (e.g., 2*sqrt(M) points).

For example, FIG. 6 shows a probability density function as an infinite number of concentric ellipses 112. Points unit 64, or some other unit of demapper 48, may be configured to determine the probability density function, including points 108 on the probability density function. The manner in which points 108 are determined by points unit 64, or some other unit of demapper 48, is described in more detail below.

In some examples, the probability density function is a Gaussian probability density function. In some cases, the probability density function is centered at vector location 106 such that the center of the concentric ellipses corresponds to vector location 106. The smallest ellipse contours 112 of FIG. 6 may represent areas of points of rotated QAM constellation 100 having a highest Gaussian probability density and the larger ellipse contours 112 may represent areas points of rotated QAM constellation 100 having a lowest Gaussian probability density. The number of ellipse contours 112 shown in FIG. 6 is arbitrary, since a true Gaussian probability density function would be represented by an infinite number of ellipse contours 112 (see equation 1.5 below). Accordingly, points unit 64 may be preconfigured to utilize a finite number of ellipse contours 112, such as three ellipse contours 112, as one example, although more or fewer ellipse contours may be used (e.g., utilize sufficient ellipse contours 112 such that the number of points 108 is equal to 2*sqrt(M)).

In general, the shape of the probability density function may be based on fading, and possibly based on the noise distribution. For example, FIG. 6 illustrates the probability density function as concentric ellipses 112 with the assumption that the noise is normally distributed resulting in the Gaussian distribution for concentric ellipses 112. However, if the noise is not normally distributed, the Gaussian distribution for concentric ellipses 112 may be replaced with some other distribution.

Unlike the sub-region approach described above used by some other techniques that determine mapped symbols within a fixed-sub-region of a rotated QAM constellation, points unit 64 may define points 108 within an area of QAM constellation 100 that is defined by a probability density function around vector location 106. The locations of the points 108 and this area are not fixed and depend on the position of vector location 106 of the received symbol (I^, Q^). The points are then used by mapped symbols unit 66 to determine mapped symbols 110 of QAM constellation 100 corresponding to points 108.

The techniques are now described relative to the computations performed by points unit 64 to determine the points 108. FIG. 6 illustrates columns 116 of mapped symbols 102 and rows 114 of mapped symbols 102. A M-QAM rotated constellation has sqrt(M) rows and sqrt(M) columns. Each row 114 and each column 116 of mapped symbols 102 can be parameterized by the following line equation (hereafter equation 1.4):

$$Q = aI + b \qquad 1.4$$

In equation 1.4, for every row 114, a=tan (ø) wherein ø represents the rotation angle 104 of rotated QAM constellation 100. For every column 116, a=tan (ø−90°). The value b is unique for each row 114 and column 116. Constants unit 78 of points unit 64 may determine the values a and b for every row 114 and column 116 and store the values a and b as parameterized data. The value of "b" may be previously computed to satisfy equation 1.4, and may be a pre-stored value. For example, on the rotated QAM constellation, the value of Q and I for a mapped symbol can be determined (e.g., based on the distance from the origin, and the angle), the value of "a" can be calculated as indicated above, allowing for the value of "b" to be predetermined (i.e., the value that satisfies equation 1.4) and pre-stored.

As described above, a demapper 48 may determine vector location 106 of the received symbol (I^, Q^) and points unit 64 may apply a probability density function to vector location 106. The following equation (hereafter equation 1.5) represents the probability density function applied by points unit 64. The probability density function is a function of fading on the I and Q components. Equation 1.5 represents the integral C of all the individual ellipse contours 112:

$$\int \exp\left(-\frac{1}{2\sigma^2}\left(\rho_I^2(I-I^{\wedge})^2 + \rho_Q^2(Q-Q^{\wedge})^2\right)\right) dI dQ = C = 1 \qquad 1.5$$

In equation 1.5, $\rho_I$ is the fade of the in-phase component I^ of the received symbol and $\rho_Q$ is the fade of the quadrature component Q^ of the received symbol, and $\sigma^2$ is the variance of additive white Gaussian random variable noise with zero mean. I and Q in equation 1.5 refer to points along the probability density function. In other words, any value of I and Q that satisfies equation 1.5, for a given value of I^ and Q^, $\rho_I$ and $\rho_Q$, and $\sigma^2$, can potentially be a point along the probability density function.

Points unit 64 of demapper 48 may determine points 108 based on the Gaussian probability density. Although there may be infinite possible points 108, in some examples, for a M-QAM rotated constellation, points unit 64 may determine a maximum of 2*sqrt(M) points 108 (e.g., sixty-four points 102 for a 64-QAM rotated constellation as shown in FIG. 6).

That is, points unit 64 may determine one point 108 for each of the quantity of sqrt(M) rows 114 of mapped symbols 102, and one point 108 for each of the quantity of sqrt(M) columns 116 of mapped symbols 102. In other words, points unit 64 may determine that points 108 comprises, a maximum of a single point 108 in each column 116 and a single point 108 in each row 114 and therefore the total maximum quantity of points 108 is 2*sqrt(M) (e.g., 16 points for a 64-QAM rotated constellation).

Points unit 64 may determine half of the points 108 based on tangential intersections between ellipse contours 112 and each of the columns 116 and the other half of points 108 based on tangential intersections between ellipse contours 112 and each of the rows 114. To determine points 108, points unit 64 may use a Lagrange multiplier as defined by equation 1.6:

$$\Lambda(I,Q) = \rho_I^2(I-\hat{I})^2 + \rho_Q^2(Q-\hat{Q})^2 + \lambda(Q - \alpha I - b) \quad 1.6$$

Equations 1.7 through 1.8 show the derivation from equation 1.6 to the simplified equation 1.9, of the Lagrange multiplier of equation 1.6. In the following equations, $r^2$ equals $\rho_I^2$ divided by $\rho_Q^2$.

Equations 1.7:

$$\frac{\partial \Lambda(I, Q)}{\partial I} = 0$$
$$\frac{\partial \Lambda(I, Q)}{\partial Q} = 0 \quad 1.7$$
$$\frac{\partial \Lambda(I, Q)}{\partial \lambda} = 0$$

Equations 1.8:

$$2\rho_I^2(I - \hat{I}) + \lambda(-a) = 0$$
$$2\rho_Q^2(Q - \hat{Q}) + \lambda = 0 \quad 1.8$$
$$(Q - aI - b) = 0$$

Equations 1.9:

$$I = \frac{\hat{I}r^2 + a(\hat{Q} - b)}{r^2 + a^2} \quad 1.9$$
$$Q = aI + b = a\frac{\hat{I}r^2 + a(\hat{Q} - b)}{r^2 + a^2} + b$$

Using equations 1.9, points unit 64 can compute the in-phase component I and quadrature component Q of each one of points 108. One point in each row 114 and one point in each column 116 is represented by a point 108 with coordinates (I, Q). The designation ($I_n$, $Q_n$) is used below to represent the $n^{th}$ point in a subset of 2*sqrt(M) points. The value of n ranges from value 0 to 2*sqrt(M)−1. The line equation that defines the $n^{th}$ row 114 or column 116 is $Q = aI + b_n$ where $b_n$ represents the intersection of the row 114 or column 116, as applicable, with the quadrature axis of rotated QAM constellation 100.

First point unit 80 may compute the first point ($I_0$, $Q_0$) of points 108 by the following equation 1.10, where vector location 106 has coordinates ($\hat{I}$, $\hat{Q}$):

$$I_0 = \frac{\hat{I}r^2 + a(\hat{Q} - b_0)}{r^2 + a^2} \quad 1.10$$
$$Q_0 = aI_0 + b_0 = a\frac{\hat{I}r^2 + a(\hat{Q} - b_0)}{r^2 + a^2} + b_0$$

With the first point ($I_0$, $Q_0$) computed by first point 80, delta unit 82 can determine a delta ($\Delta I$, $\Delta Q$) for use by points unit 64 to determine the other points 108. For instance, the next row/column (e.g., n=1) can be represented by points unit 64 as line equation $Q = aI + b_1 = aI + b_0 + \Delta b$. The value $\Delta b$ is constant for each point 108 and equal to $b_1 - b_0$. The intersection value ($I_1$, $Q_1$) can therefore be represented by points unit 64 as the following equation 1.11:

$$I_1 = \frac{\hat{I}r^2 + a(\hat{Q} - (b_0 + \Delta b))}{r^2 + a^2} \quad 1.11$$
$$= I_0 - \frac{a\Delta b}{r^2 + a^2}$$
$$= I_0 + \Delta I$$

$$Q_1 = aI_0 + b_0$$
$$= Q_0 - \frac{a\Delta b}{r^2 + a^2} + \Delta b$$
$$= Q_0 + \frac{r^2 \Delta b}{r^2 + a^2}$$
$$= Q_0 + \Delta Q$$

As shown above in equation 1.11, points unit 64 may define ($I_1$, $Q_1$) by the sum of ($I_0$, $Q_0$) and ($\Delta I$, $\Delta Q$). In this example, delta unit 82 computes ($\Delta I$, $\Delta Q$) on behalf of points unit 64. In general, points unit 64 determines each point ($I_n$, $Q_n$) by the sum of ($I_0$, $Q_0$) and the product of n times ($\Delta I$, $\Delta Q$) as the value of n ranges from 0 to (sqrt(M)−1) as seen from the following equation 1.12, and the calculations are repeated (i.e., the value of n ranges from 0 to sqrt(M)−1 for the rows, and then the value of n ranges from 0 to sqrt(M)−1 for the columns)

$$I_n = \frac{\hat{I}r^2 + a(\hat{Q} - (b_0 + n\Delta b))}{r^2 + a^2} \quad 1.12$$
$$= I_0 - n\frac{a\Delta b}{r^2 + a^2}$$
$$= I_0 + n\Delta I$$

$$Q_n = aI_n + b_n$$
$$= Q_0 - n\frac{a\Delta b}{r^2 + a^2} + n\Delta b$$
$$= Q_0 + n\frac{r^2 \Delta b}{r^2 + a^2}$$
$$= Q_0 + n\Delta Q$$

The following table 1.1 summarizes the computations performed by points unit 64.

| Computation Order to be performed | Type of Operation | Number of arithmetic Operations | Location of operation |
|---|---|---|---|
| 1  $r^2 = \frac{\rho_I^2}{\rho_Q^2}$ | Divider | 1 | Unit 78 |
| 2  For the different line parameter a of each row and each column determine $\frac{1}{r^2 + a^2}$ | Look Up Table (LUT) | 1 | Unit 78 |

| Computation Order to be performed | | Type of Operation | Number of arithmetic Operations | Location of operation |
|---|---|---|---|---|
| 3 | $I_0 = \dfrac{\hat{I}r^2 + a(\hat{Q} - b_0)}{r^2 + a^2}$ | Multiplication | 3 | Unit 80 |
| 4 | $\Delta I = -\dfrac{a\Delta b}{r^2 + a^2}$ | Multiplication | 1 | Unit 82 |
| 5 | $Q_0 = a\dfrac{\hat{I}r^2 + a(\hat{Q} - b_0)}{r^2 + a^2} + b_0$ | Multiplication | 4 | Unit 80 |
| 6 | $\Delta Q = \dfrac{r^2 \Delta b}{r^2 + a^2}$ | Multiplication | 2 | Unit 82 |
| 7 | $(I_n, Q_n)$ | Addition | M − 1 | Unit 64 |

Points unit 64 may determine points 108 with coordinate locations relative to rotated QAM constellation 100 represented by $(I_n, Q_n)$. With points 108 determined, mapped symbols unit 66 of demapper 48 may determine corresponding mapped symbols for points 108. It should be understood that the techniques to determine $(I_n, Q_n)$ are based on computing the value of $r^2$ which is based on the fading. Accordingly, the probability density function, which is manner in which $(I_n, Q_n)$ are determined is based on the fading.

In other words, mapped symbols unit 66 may map points 108 to corresponding mapped symbols 110 of the rotated QAM constellation for determining the plurality of bits based on the corresponding mapped symbols 110. The corresponding mapped symbols 110 are a subset of the rotated QAM constellation mapped symbols 102.

In some examples, mapped symbols unit 66 may include a look up table (LUT) that mapped symbols unit 66 may use to determine the corresponding mapped symbols 110. The corresponding mapped symbols 110 represent the mapped symbols 102 that share locations on rotated QAM constellation 100 nearest to points 108. For example, for each of points 108 $(I_0, Q_0) \ldots (I_{\sqrt{M}-1}, Q_{\sqrt{M}-1})$ for rows and columns, mapped symbols unit 66 may match the Cartesian coordinates of each point 108 to the coordinates of a different one of the locations of the mapped symbols 102 in the lookup table. The output of mapped symbols 66 may be the corresponding mapped symbols 110 nearest to the tangential intersections of ellipse contours 112 and rows 114 of mapped symbols 102 or columns 116 of mapped symbols 102, as applicable.

With corresponding mapped symbols 110 selected, metric unit 68 computes the metric (defined in equation 1.3) for each of the 2*sqrt(M) corresponding mapped symbols 110. The value x in equation 1.3 represents the $x^{th}$ corresponding mapped symbol 110 in a quantity of 2*sqrt(M)−1 symbols.

For each bit position of the transmission, and from the corresponding mapped symbols, Log-likelihood ratio unit 72 (LLR unit 72) may determine the LLR values based on corresponding mapped symbol 110. For example, LLR unit 72 may receive the metric for each of the corresponding mapped symbols from metric unit 68 and determine the minimum of the metric values for the hypothesis of 0 (i.e., $c_i^0$) and the minimum of the metric values for the hypothesis of 1 (i.e., $c_i^1$).

In some examples, LLR unit 72 may be preconfigured with information that indicates which ones of symbols 102 are associated with the hypothesis of 1 and which ones of symbols 102 are associated with the hypothesis of 0 for each bit.

For example, for bit 0, some of mapped symbols 102 may be associated with hypothesis of 0 and others may be associated with hypothesis of 1. For bit 1, some of the mapped symbols 102 that were associated with hypothesis of 0 for bit 0 may be associated with the hypothesis of 1 for bit 1. Similarly, for bit 1, some of the mapped symbols that were associated with hypothesis of 1 for bit 0 may be associated with the hypothesis of 0 for bit 1. LLR unit 72 may be preconfigured with such information.

For instance, for bit 0, each one of mapped symbols 110 may be associated with the hypothesis of 1 or the hypothesis of 0, and LLR unit 72 may implement equation 1.2 with the computed metrics from equation 1.3, where $I_x$ and $Q_x$ of equation 1.3 refer to the mapped symbols 110. LLR unit 72 may determine the minimum of the computation metric of equation 1.2 for mapped symbols 110 (which are a subset of symbols 102) with hypothesis 1 and determine the minimum of the computation metric of equation 1.2 for all mapped symbols 110 with hypothesis 0, LLR unit 72 may then subtract the two minimum values and scale the result based on the noise to determine the LLR value of bit 0.

LLR unit 72 may then repeat the same procedure for bit 1. However, for bit 1, some of mapped symbols 110 that were associated with hypothesis 0 may now be associated with the hypothesis of 1, and vice-versa. In this case, LLR unit 72 may not need to recompute all of the metrics. Rather, LLR unit 72 may need to determine which ones of the previously computed metrics should now be associated with a different one of the hypothesis.

As an illustrative example, for simplicity, assume that there are four mapped symbols 110 (i.e., a first, second, third, and fourth mapped symbol). For bit 0, assume that the first and second mapped symbols are associated with the hypothesis of 0 and the third and fourth mapped symbols are associated with the hypothesis of 1. In this example, LLR unit 72 may compute the metrics as given by equation 1.2 for the first, second, third, and fourth mapped units. In this example, assume that the first metric is for the first mapped symbol, the second metric is for the second mapped symbol, the third metric is for the third mapped symbol, and the fourth metric is for the fourth mapped symbol. LLR unit 72 may determine the minimum between the first and second metrics (assume that to be the first metric) and the minimum between the third and fourth metrics (assume that to be the third metric). LLR unit 72 may then subtract the first metric from the third metric to determine the LLR value for bit 0.

Then, for bit 1, assume that the first and third symbols are associated with the hypothesis of 0 and the second and fourth symbols are associated with the hypothesis of 1. In this example, LLR unit 72 may not need to compute the metrics as given by equation 1.2 because LLR unit 72 already computed the metrics of bit 0 (e.g., does not need to re-compute the first, second, third, and fourth metrics). For bit 1, LLR unit 72 may determine the minimum between the first and third metrics (assume that to be the first metric) and the minimum between the second and fourth metrics (assume that to be the fourth metric). LLR unit 72 may then subtract the first metric from the fourth metric to determine the LLR value for bit 1.

LLR unit 72 may then repeat these steps for each of the plurality of bits. However, for bits after bit 0, LLR unit 72 may not need to re-compute the metrics.

In this way, for soft demapping, LLR unit 72 may determine the LLR value from each corresponding mapped symbol 110 for each bit position i of the transmitted bit stream (e.g., the plurality of bits). In other words, when soft demapping, LLR unit 72 may determine the LLR value based on each of the corresponding mapped symbols 110 for the first bit of the plurality of bits sent by TX device 12, the second bit, ..., and the $i^{th}$ bit.

In some examples, LLR unit 72 may receive the current bit position i from bit position unit 70. Bit position unit 70 may start with bit position i equal to zero and increment the bit position with each minimum LLR value determined by LLR 72.

LLR output 74 may receive the LLR value associated with each of the plurality of bits. For each bit position associated with the plurality of bits transmitted by TX device 12, LLR output 74 may receive an LLR value. In other words, LLR unit 72 may determine a plurality of log-likelihood ratio (LLR) values for the plurality of bits based on the corresponding mapped symbols 110. LLR output 74 may receive the plurality of LLR values and transmit the plurality of LLR values to, for example, bit de-interleaver 50 and channel decoder 52.

For hard demapping, there may not be a need to compute LLR values. Rather, for hard demapping, metric unit 68 may be configured to implement equation 1.3 for each one of mapped symbols 110, and may be configured to determine which one of mapped symbols 110 is closest to the received symbol on QAM constellation 100. Metric 68 may indicate which one of mapped symbols 110 is closest to the received symbol on QAM constellation to bit output unit 76. Bit output unit 76 may determine the plurality of bits associated with the one of mapped symbols 110 that is closest to the received symbol, and output he plurality of bits (e.g., to bit de-interleaver 50 and channel decoder 52).

Accordingly, in the techniques described in this disclosure, rather than comparing every mapped symbol on the rotated QAM constellation to determine all of the LLR values (like the full LLR and full Max-log LLR algorithms) or comparing all the mapped symbols in one of a plurality of fixed sub-regions of the rotated QAM constellation (like the sub-region algorithm), the demapper according to the techniques described in this disclosure determines points that are more likely (e.g., more probable) to map to the vector location based on a Gaussian probability density function. Although each one of the points may not correspond to a mapped symbol location, each point may have a closest corresponding mapped symbol. The demapper determines the corresponding mapped symbol (e.g., the mapped symbols closest to the points) and computes the metric based on the corresponding mapped symbols.

A demapper according to the techniques of this disclosure may perform a maximum of 2*sqrt(M) metric calculations (e.g., 16 for 64-QAM). The number of metric calculations is less than the number of metric computations performed by both the full Max-Log LLR algorithm which performs M metric calculations (e.g., 64 for 64-QAM) and the sub-region algorithm which performs $[(\sqrt{M})/2+1]2$ metric-calculations (e.g., 25 for 64-QAM). In addition to performing fewer metric calculations, the demapper according to the techniques of this disclosure obtains optimal LLR values at each bit position corresponding to the received symbol at a vector location since the demapper adjusts for the inherent fade "p" of the received QAM symbol, whereas the sub-region algorithm does not. Furthermore, the techniques described in this disclosure may generate LLR values that are substantially the same as the LLR values resulting from the full Max-Log algorithm, but with fewer computations.

Figure 7:
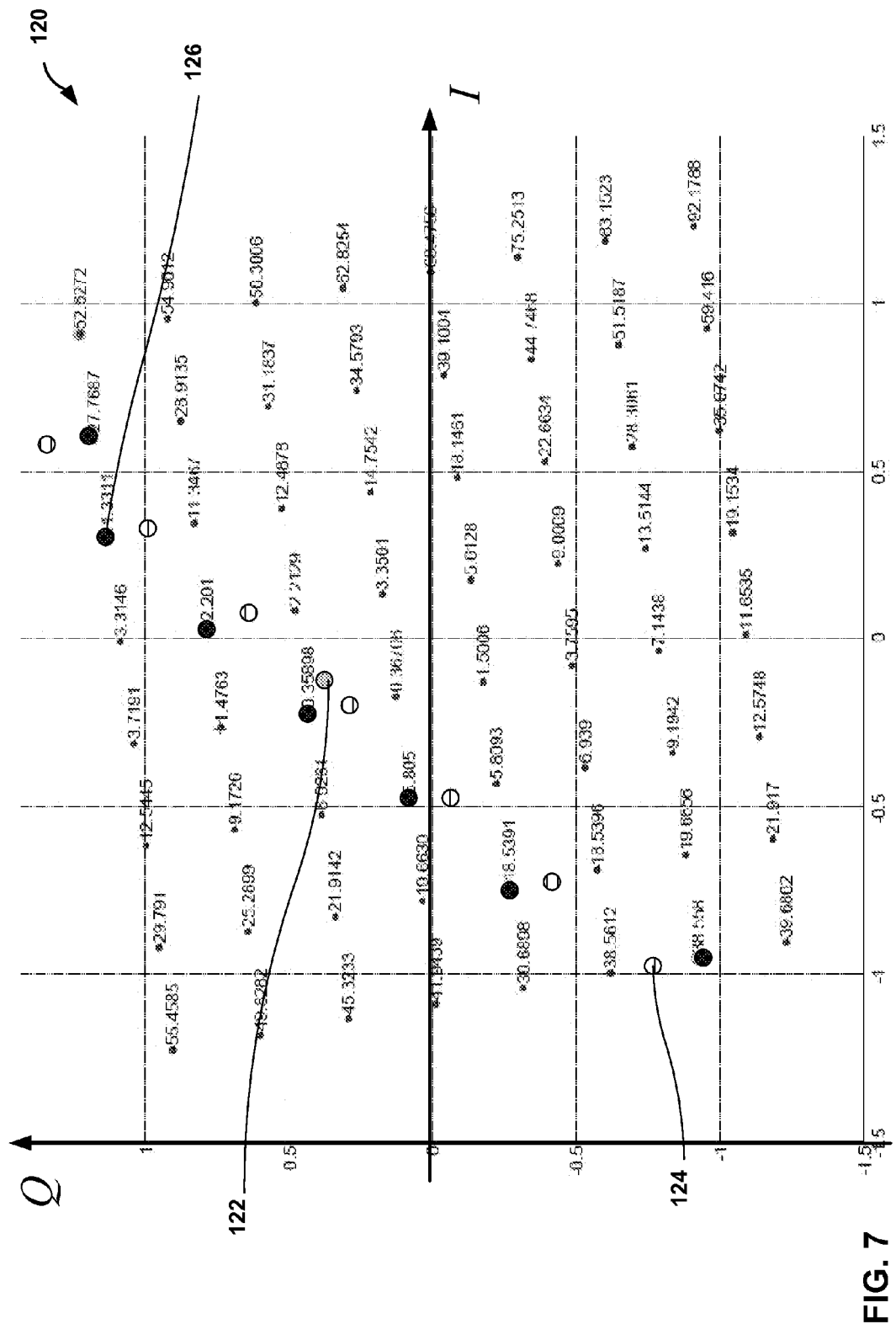
FIG. 7 is conceptual diagram illustrating techniques for determining a plurality of LLR values from a rotated QAM constellation, in accordance with one or more aspects of the present disclosure.

FIG. 7 is a conceptual diagram illustrating techniques for determining a plurality of LLR values from a rotated QAM constellation, in accordance with one or more aspects of the present disclosure. FIG. 7 shows rotated QAM constellation 120. Constellation 120 is a 64-QAM constellation. A demapper (e.g., demapper 48) may receive a symbol that represents a transmitted QAM symbol that indicates a plurality of bits. The demapper may determine vector location 122 of the received symbol within a QAM constellation. For example the demapper may plot the in-phase and quadrature phase components of the received symbol to a QAM constellation such as rotated QAM constellation 120.

The demapper may define points 124 of the QAM constellation around vector location 122 based on a probability density function applied to vector location 122. For example, the demapper may determine the points based on a Gaussian probability density function centered at vector location 122. The points may correspond to intersections between rows of mapped symbols of constellation 120 and elliptical contours based on the Gaussian probability density function. The points may further include points that correspond to intersections between columns of mapped symbols of constellation 120 and elliptical contours based on the Gaussian probability density function.

The demapper may map points 124 to corresponding mapped symbols 126 of rotated QAM constellation 120 for determining the plurality of bits based on the corresponding mapped symbols 126. For example, the demapper may determine a corresponding mapped symbol 126 nearest to each of points 124. For each position of the plurality of bits, the demapper may determine an LLR value based on the corresponding mapped symbols 126. The demapper may output the LLR value of each bit position to a decoder for determining the plurality of bits.

Figure 8:
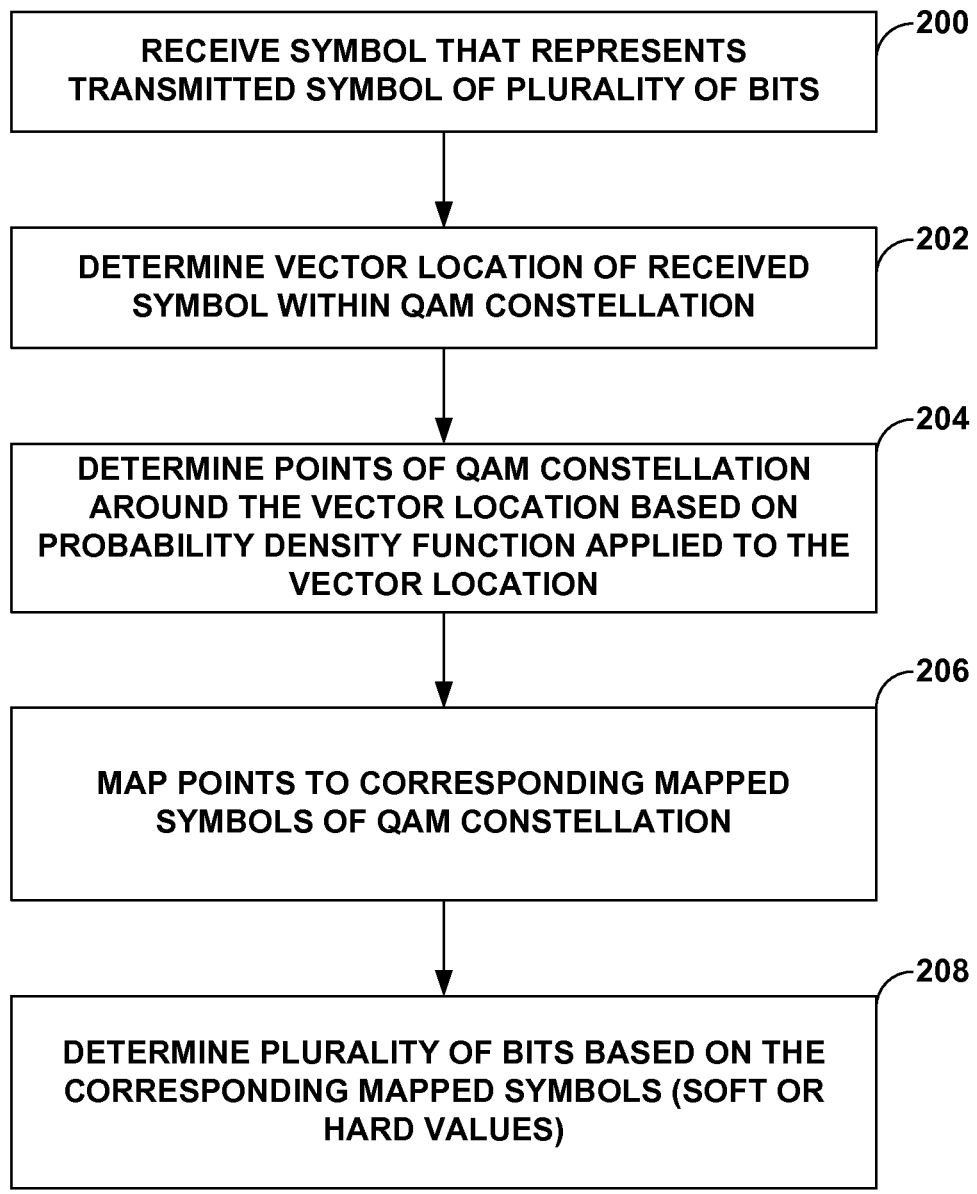
FIG. 8 is a flowchart illustrating an example of the soft demapping or hard demapping operation, in accordance with one or more aspects of the present disclosure.

FIG. 8 is a flowchart illustrating an example of the soft demapping or hard demapping operation, in accordance with one or more aspects of the present disclosure. The description of FIG. 8 is described below within the context of system 10 of FIG. 1 and rotated QAM constellation 100 of FIG. 6. Also, the techniques illustrated in FIG. 8 may be performed by one or more processors. Examples of the one or more processors include baseband processor 36. In some examples, demapper 48 of baseband processor 36 may be configured to implement the techniques illustrated in FIG. 8.

The one or more processors may receive a symbol that represents a transmitted symbol of a plurality of bits (200). For example, vector location unit 62 of demapper 48 may receive information about received symbol (I^, Q^) received over independent OFDM subcarrier signals. Demapper 48 may determine a vector location of the received symbol (I^, Q^) within a rotated QAM constellation (202). For example, vector location unit 62 of demapper may determine vector location 106 of constellation 100 of FIG. 6 corresponds to the vector location of received symbol (I^, Q^).

The one or more processors may determine points of the QAM constellation around the vector location based on a probability density function applied to the vector location (204). For example, points unit 64 may determine points 108 based on a Gaussian probability density function applied to vector location 106. For a M-QAM constellation, in some examples, demapper 48 may determine $2\sqrt{M}$ points, e.g., one point at each tangential intersection of ellipse contours 112 and rows 114 and one point at each tangential intersection of ellipse contours 112 and columns 116. However, demapper 48 may determine more or fewer points.

The one or more processors may map the points to corresponding mapped symbols of the QAM constellation (206). The one or more processors may determine the plurality of bits from the corresponding mapped symbols (208) (e.g., from hard values or soft values). For example, mapped symbols unit 66 may utilize a look up table to determine the closest corresponding mapped symbols 110 to the locations of the subset of points determined by points unit 64. Metric unit 68 may compute the metric (e.g., equation 1.3) between vector location 106 and each of the corresponding mapped symbols 110. For each bit position (in the case of soft demapping) LLR unit 72 may compute the LLR values (e.g., equation 1.2) of each of the corresponding mapped symbols 110 using the metrics determined by metric unit 68. LLR output unit 74 may output the LLR value for each bit position of the plurality of bits associated with the received symbol $(\hat{I}, \hat{Q})$.

Figure 9:
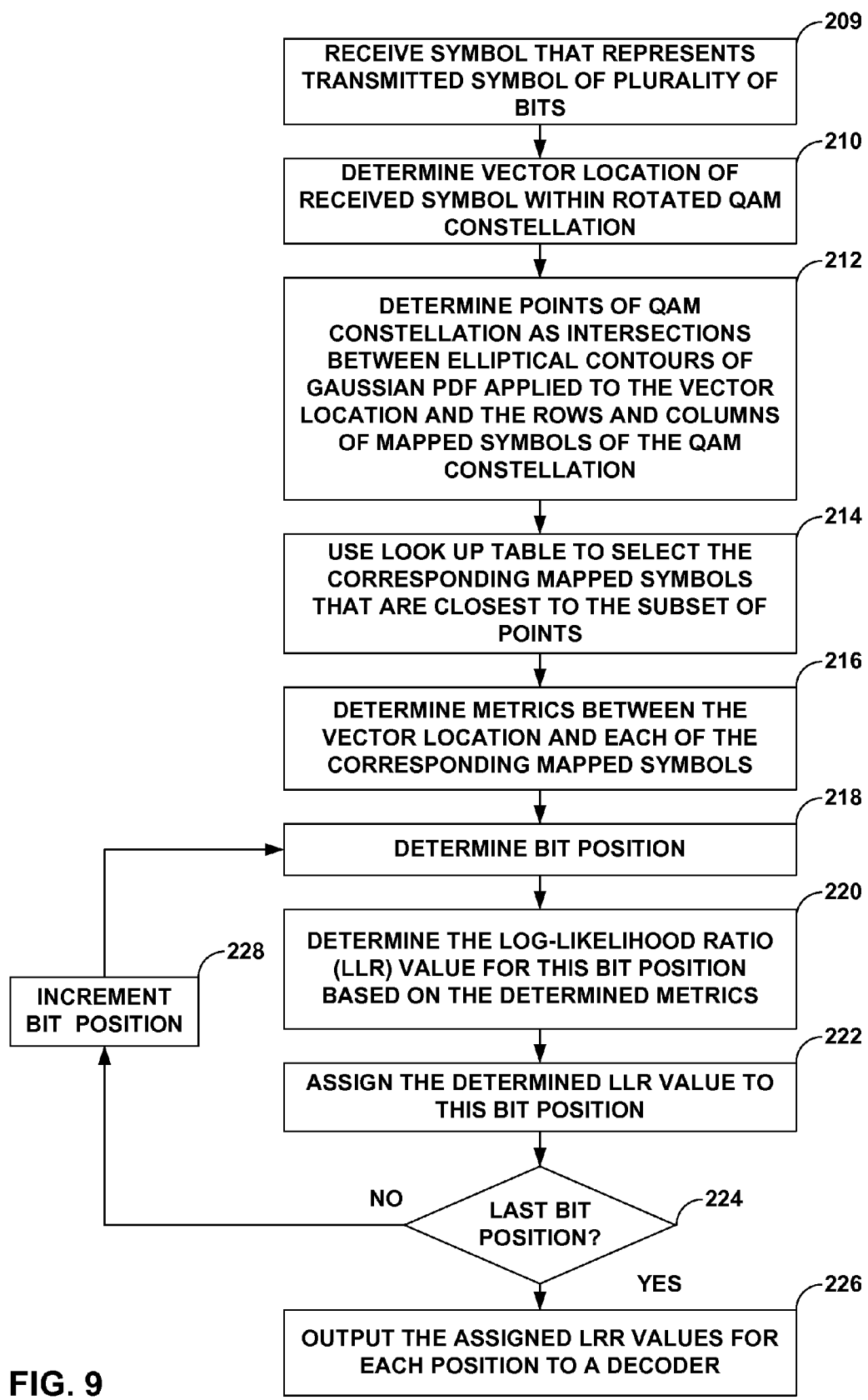
FIG. 9 is a flowchart illustrating further example operations, in accordance with one or more aspects of the present disclosure.

FIG. 9 is a flowchart illustrating further example operations, in accordance with one or more aspects of the present disclosure. The description of FIG. 9 is described below within the context of system 10 of FIG. 1 and rotated QAM constellation 100 of FIG. 6, and described as being performed by one or more processors.

The one or more processors may receive a symbol that represents a transmitted symbol of a plurality of bits (209). For example, vector location unit 62 of demapper 48 may receive information about received symbol $(\hat{I}, \hat{Q})$ received over independent OFDM carrier signals.

The one or more processors may determine a vector location of the received symbol within a rotated QAM constellation (210). For example, vector location unit 62 of demapper may determine that vector location 106 of constellation 100 of FIG. 6 corresponds to the vector location of received symbol $(\hat{I}, \hat{Q})$.

The one or more processors may define points of the QAM constellation as intersections between elliptical contours of a Gaussian probability density function (PDF) applied to the vector location and the rows and columns of mapped symbols of the QAM constellation (212). For example, points unit 64 may apply a Gaussian PDF to vector location 106. For example, each tangential intersection of ellipse contours 112 and rows 114, points unit 64 may determine a point of points 108. For each tangential intersection of ellipse contours 112 and columns 116, points unit 64 may also determine a point of points 108. Points unit 64 may determine $2\sqrt{M}$ points 108, e.g., one point for each of the M rows and one point for each of the M columns of rotated QAM constellation 100.

The one or more processors may use a look up table to select the corresponding mapped symbols that are closest to the points (214). For example, mapped symbols unit 66 may utilize a look up table to determine the closest corresponding mapped symbols 110 to the locations of points 108 determined by points unit 64.

The one or more processors may determine metrics between the vector location and each of the corresponding mapped symbols (216). For example, metric unit 68 of demapper 48 may compute the metric (e.g., equation 1.3) between vector location 106 and each of the corresponding mapped symbols 110 determined by mapped symbols unit 66.

The one or more processors may determine a bit position (218). For example, in soft demapping, demapper 48 may output an LLR value for each bit position of the plurality of bits associated with received symbol (I, Q). LLR unit 72 may receive a bit count from bit position unit 70 that increments as the minimum LLR value for each bit is determined. LLR unit 72 may receive the current bit from bit position 70.

The one or more processors may determine the log-likelihood ratio (LLR) value for this bit position based on the determined metrics (220). For the $i^{th}$ bit, LLR unit 72 may compute the LLR values (e.g., equation 1.3) based on the corresponding mapped symbols 110. LLR unit 72 may assign the LLR value to this bit position (222).

The one or more processors may determine whether this is the last bit position (224). If it is not the last bit position, the one or more processors may increment the bit position (228) and repeat steps (218) through (222). For example, when LLR unit 72 finishes computing the LLR value of this bit position, LLR unit 72 determines whether this bit position is the last bit position of the plurality of bits. If not, bit position unit 70 increments the bit position (e.g., i=i+1). If the one or more processors determine that this is the last bit position, the one or more processors may output the assigned LLR values for each position to a decoder (226). For example, LLR output unit 74 may output the LLR values determined by LLR unit 72 for each bit position of the plurality of bits associated with the received symbol $(\hat{I}, \hat{Q})$.

FIG. 10 is a conceptual diagram illustrating sub-regions of a QAM constellation. As described above, in some other techniques, a processor divides the QAM constellation into sub-regions. FIG. 10 illustrates one such example of dividing the QAM constellation into sub-regions (i.e., sub-regions 228, 230, 232, and 234). In these other techniques, the processor may determine which sub-region includes the received QAM symbol, and may compute metrics based on the symbols with the sub-region. However, the sub-regions fail to account of fading, and accordingly provide worse performance as compared to the full LLR, full Max-Log LLR, and the techniques described in this disclosure.

The techniques described herein may be implemented in hardware, firmware, or any combination thereof. The hardware may, also execute software. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable storage medium comprising instructions that, when executed, cause a processor to perform one or more of the techniques described above.

A computer-readable storage medium may form part of a computer program product, which may include packaging materials. A computer-readable storage medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications.

Various examples have been described. These and other examples are within the scope of the following claims.

What is claimed is:

1. A method for quadrature amplitude modulation (QAM) processing in a rotated QAM constellation, the method comprising:
   determining, by one or more processors, a vector location, within the rotated QAM constellation, of a received symbol that indicates a plurality of bits;
   determining, by the one or more processors, points within the rotated QAM constellation around the vector location based on a probability density function applied to the vector location;
   mapping, by the one or more processors, the points to corresponding mapped symbols of the rotated QAM constellation; and
   determining, by the one or more processors, the plurality of bits based on the corresponding mapped symbols.

2. The method of claim 1, further comprising:
   determining a plurality of log-likelihood ratio (LLR) values for the plurality of bits based on the corresponding mapped symbols; and
   determining the plurality of bits based on the plurality of LLR values.

3. The method of claim 2, further comprising:
   determining a metric for each of the corresponding mapped symbols; and
   determining the plurality of LLR values based on the metrics of the corresponding mapped symbols.

4. The method of claim 3, wherein the metrics of the corresponding mapped symbols are used to compute Max-Log LLR values.

5. The method of claim 1, further comprising selecting the corresponding mapped symbols that are closest to locations of the points.

6. The method of claim 1, further comprising determining the points based on locations of the rotated QAM constellation at which at least one of columns or rows of the corresponding mapped symbols of the rotated QAM constellation intersect contours of the probability density function.

7. The method of claim 6, wherein the contours of the probability density function are elliptical.

8. The method of claim 1, wherein the probability density function comprises a Gaussian probability density function.

9. The method of claim 8, wherein the Gaussian probability density function is centered at the vector location.

10. The method of claim 1, further comprising determining the probability density function based on an amount of fade of an in-phase component of the received symbol and an amount of fade of a quadrature component of the received symbol.

11. The method of claim 1, wherein the received symbol is from a wireless transmission of a wireless transmission device.

12. The method of claim 1, wherein the corresponding mapped symbols are a subset comprising less than all mapped symbols within the rotated QAM constellation.

13. The method of claim 1, wherein determining the plurality of bits comprises determining the plurality of bits based on the corresponding mapped symbols and no other mapped symbols of the rotated QAM constellation.

14. A device for quadrature amplitude modulation (QAM) processing in a rotated QAM constellation, the device comprising:
   circuitry configured to receive a transmitted symbol indicating a plurality of bits; and
   one or more processors configured to:
      determine a vector location of the received symbol within the rotated QAM constellation;
      determine points within the rotated QAM constellation around the vector location based on a probability density function applied to the vector location;
      map the points to corresponding mapped symbols of the rotated QAM constellation; and
      determine the plurality of bits based on the corresponding mapped symbols.

15. The device of claim 14, wherein the one or more processors are further configured to:
   determine a plurality of log-likelihood ratio (LLR) values for the plurality of bits based on the corresponding mapped symbols; and
   determine the plurality of bits based on the plurality of LLR values.

16. The device of claim 15, wherein the one or more processors are further configured to:
   determine a metric for each of the corresponding mapped symbols; and
   determine the plurality of LLR values based on the metrics of the corresponding mapped symbols.

17. The device of claim 16, wherein the metrics of the corresponding mapped symbols are used to compute Max-Log LLR values.

18. The device of claim 14, wherein the one or more processors are further configured to select the corresponding mapped symbols that are closest to locations of the points.

19. The device of claim 14, wherein the one or more processors are further configured to determine the points based on locations of the rotated QAM constellation at which at least one of columns or rows of the corresponding mapped symbols of the rotated QAM constellation intersect contours of the probability density function.

20. The device of claim 19, wherein the contours of the probability density function are elliptical.

21. The device of claim 14, wherein the probability density function comprises a Gaussian probability density function.

22. The device of claim 21, wherein the Gaussian probability density function is centered at the vector location.

23. The device of claim 14, wherein the one or more processors are further configured to determine the probability density function based on an amount of fade of an in-phase component of the received symbol and an amount of fade of a quadrature component of the received symbol.

24. The device of claim 14, wherein the received symbol is received from a wireless transmission of a wireless transmission device.

25. The device of claim 14, wherein the corresponding mapped symbols are a subset comprising less than all mapped symbols within the rotated QAM constellation.

26. The device of claim 14, wherein the one or more processors are further configured to determine the plurality of bits based on the corresponding mapped symbols and no other mapped symbols of the rotated QAM constellation.

27. The device of claim 14, wherein the device comprises one of:
   a receiver device;
   a wireless phone;
   a wireless handset;
   a smart phone; and
   a tablet computing device.

28. The device of claim 14, wherein the one or more processors comprise a baseband processor.

29. An integrated circuit (IC) device for quadrature amplitude modulation (QAM) processing in a rotated QAM constellation, the IC device comprising:
    circuitry configured to receive a transmitted symbol indicating a plurality of bits; and
    a QAM demapper unit configured to:
        determine a vector location, within the rotated QAM constellation, of the received symbol indicating the plurality of bits within the rotated QAM constellation;
        determine points within the rotated QAM constellation around the vector location based on a probability density function applied to the vector location;
        map the points to corresponding mapped symbols of the rotated QAM constellation; and
        determine the plurality of bits based on the corresponding mapped symbols.

30. The IC device of claim 29, wherein the QAM demapper unit is further configured to:
    determine a plurality of log-likelihood ratio (LLR) values for the plurality of bits based on the corresponding mapped symbols; and
    determine the plurality of bits based on the plurality of LLR values.

31. The IC device of claim 30, wherein the QAM demapper unit is further configured to:
    determine a metric for each of the corresponding mapped symbols; and
    determine the plurality of LLR values based on the metrics of the corresponding mapped symbols.

32. The IC device of claim 31, wherein the metrics of the corresponding mapped symbols are used by the QAM demapper unit to compute Max-Log LLR values.

33. The IC device of claim 29, wherein the QAM demapper unit is further configured to select the corresponding mapped symbols that are closest to locations of the points.

34. The IC device of claim 29, wherein the QAM demapper unit is further configured to determine the points based on locations of the rotated QAM constellation at which at least one of columns or rows of the corresponding mapped symbols of the rotated QAM constellation intersect contours of the probability density function.

35. The IC device of claim 34, wherein the contours of the probability density function are elliptical.

36. The IC device of claim 29, wherein the probability density function comprises a Gaussian probability density function.

37. The IC device of claim 36, wherein the Gaussian probability density function is centered at the vector location.

38. The IC device of claim 29, wherein the QAM demapper unit is further configured to determine the probability density function based on an amount of fade of an in-phase component of the received symbol and an amount of fade of a quadrature component of the received symbol.

39. The IC device of claim 29, wherein the received symbol is received from a wireless transmission of a wireless transmission device.

40. The IC device of claim 29, wherein the corresponding mapped symbols are a subset comprising less than all mapped symbols within the rotated QAM constellation.

41. The IC device of claim 29, wherein the QAM demapper unit is further configured to determine the plurality of bits based on the corresponding mapped symbols and no other mapped symbols of the rotated QAM constellation.

42. A device for quadrature amplitude modulation (QAM) processing in a rotated QAM constellation, the device comprising:
    means for receiving a transmitted symbol indicating a plurality of bits;
    means for determining a vector location of the received symbol within the rotated QAM constellation;
    means for determining points within the rotated QAM constellation around the vector location based on a probability density function applied to the vector location;
    means for mapping the points to corresponding mapped symbols of the rotated QAM constellation; and
    means for determining the plurality of bits based on the corresponding mapped symbols.

43. The device of claim 42, further comprising means for determining the points based on locations of the rotated QAM constellation at which at least one of columns or rows of the corresponding mapped symbols of the rotated QAM constellation intersect contours of the probability density function.

44. The device of claim 42, further comprising means for determining the probability density function based on an amount of fade of an in-phase component of the received symbol and an amount of fade of a quadrature component of the received symbol.

45. The device of claim 42, further comprising means for determining the plurality of bits based on the corresponding mapped symbols and no other mapped symbols of the rotated QAM constellation.

46. A non-transitory computer-readable storage medium having instructions stored thereon that, when executed, cause one or more processors of a device, for quadrature amplitude modulation (QAM) processing in a rotated QAM constellation, to:
    determine a vector location, within the rotated QAM constellation, of a received symbol that indicates a plurality of bits;
    determine points within the rotated QAM constellation around the vector location based on a probability density function applied to the vector location;
    map the points to corresponding mapped symbols of the rotated QAM constellation; and
    determine the plurality of bits based on the corresponding mapped symbols.

47. The non-transitory computer-readable storage medium of claim 46, wherein the instructions, when executed, further cause the one or more processors to determine the points based on locations of the rotated QAM constellation at which at least one of columns or rows of the corresponding mapped symbols of the rotated QAM constellation intersect contours of the probability density function.

48. The non-transitory computer-readable storage medium of claim 46, wherein the instructions, when executed, further cause the one or more processors to determine the probability density function based on an amount of fade of an in-phase component of the received symbol and an amount of fade of a quadrature component of the received symbol.

49. The non-transitory computer-readable storage medium of claim 46, wherein the instructions, when executed, further cause the one or more processors to determine the plurality of bits based on the corresponding mapped symbols and no other mapped symbols of the rotated QAM constellation.

* * * * *